US010282525B2

(12) United States Patent
Kashiyama et al.

(10) Patent No.: US 10,282,525 B2
(45) Date of Patent: May 7, 2019

(54) INFORMATION PROCESSING SYSTEM, INFORMATION PROCESSING APPARATUS, ACCESS CONTROL METHOD, AND PROGRAM

(71) Applicants: Shigeki Kashiyama, Tokyo (JP); Masato Nakajima, Tokyo (JP); Hiroki Ohzaki, Kanagawa (JP); Yasuharu Fukuda, Tokyo (JP)

(72) Inventors: Shigeki Kashiyama, Tokyo (JP); Masato Nakajima, Tokyo (JP); Hiroki Ohzaki, Kanagawa (JP); Yasuharu Fukuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 280 days.

(21) Appl. No.: 14/923,626

(22) Filed: Oct. 27, 2015

(65) Prior Publication Data
US 2016/0125177 A1   May 5, 2016

(30) Foreign Application Priority Data

Oct. 30, 2014  (JP) .................. 2014-221763

(51) Int. Cl.
*G06F 21/31* (2013.01)
*G06F 21/33* (2013.01)
*H04L 29/06* (2006.01)

(52) U.S. Cl.
CPC .............. *G06F 21/31* (2013.01); *G06F 21/33* (2013.01); *H04L 63/0807* (2013.01)

(58) Field of Classification Search
CPC ....... G06F 21/31; G06F 21/33; H04L 63/0807
(Continued)

(56) References Cited

U.S. PATENT DOCUMENTS

2006/0021018 A1   1/2006   Hinton et al.
2009/0037995 A1*  2/2009   Zapata .................. G06F 21/43
                                                726/9
(Continued)

FOREIGN PATENT DOCUMENTS

JP    2004-94619     3/2004
JP    2006-031714    2/2006
(Continued)

OTHER PUBLICATIONS

Japanese Office Action for 2014-221763 dated May 8, 2018.

*Primary Examiner* — Jason K Gee
*Assistant Examiner* — Angela R Holmes
(74) *Attorney, Agent, or Firm* — IPUSA, PLLC

(57) ABSTRACT

An information processing system including at least one information processing apparatus includes an access control unit configured to receive a request from a service use apparatus to a service providing apparatus, to give, in a case where the request includes information of a completed authentication, based on setup information in which a type of giving information to be given to the request is set, the giving information of the type set in the setup information, and to send the request to the service providing apparatus; and an information providing unit configured to administer the giving information corresponding to the information of the completed authentication, and to provide the giving information corresponding to the information of the completed authentication received from the access control unit to the access control unit.

13 Claims, 21 Drawing Sheets

(58) Field of Classification Search
USPC .......................................................... 726/10
See application file for complete search history.

(56) References Cited

U.S. PATENT DOCUMENTS

| | | | | |
|---|---|---|---|---|
| 2010/0088519 A1* | 4/2010 | Tsuruoka | ................ | G06F 21/33 |
| | | | | 713/176 |
| 2012/0331539 A1 | 12/2012 | Matsugashita | | |
| 2015/0200926 A1 | 7/2015 | Fukuda | | |

FOREIGN PATENT DOCUMENTS

| JP | 2008-123027 | 5/2008 |
|---|---|---|
| JP | 2009-230354 | 10/2009 |
| JP | 2010-56627 | 3/2010 |
| JP | 2010-267118 | 11/2010 |
| JP | 2013-8229 | 1/2013 |
| JP | 2015-133034 | 7/2015 |

* cited by examiner

FIG.9

| TENANT ID |
|---|
| TENANT NAME |
| DISPLAY LANGUAGE |
| TIME ZONE |
| STATE |
| COUNTRY |

FIG.10

| TENANT ID |
|---|
| USER ID |
| MAIL ADDRESS |
| PASSWORD |
| USER NAME |
| DISPLAY LANGUAGE |
| TIME ZONE |
| STATE |

FIG.11

| |
|---|
| SERVICE TYPE |
| LICENSE ID |
| SALES REGION |
| COUNTRY |
| TIME ZONE |
| COMMODITY CODE |
| QUANTITY (NUMBER OF APPARATUSES) |
| USE START DATE |
| BILLING START DATE |
| USE END DATE |
| SCHEDULED CANCELLATION DATE |
| STATE |
| PARENT SERVICE TYPE |
| PARENT LICENSE ID |
| REGISTRATION CODE |
| MACHINE TYPE AND MACHINE NUMBER |
| NEXT LICENSE TYPE |
| NEXT LICENSE ID |
| LICENSE TYPE |
| LICENSE MODE |
| QUANTITY (NUMBER OF USERS) |
| NUMBER OF APPARATUSES IN USE |
| NUMBER OF USERS IN USE |
| CONTRACT MODE |

FIG.12

| SERVICE ID |
| --- |
| TENANT ID |
| MACHINE TYPE AND MACHINE NUMBER |
| ACTIVATED DATE |

FIG.13

| TENANT ID |
| --- |
| DEVICE AUTHENTICATION INFORMATION |
| BUSINESS OFFICE INFORMATION |
| CAPABILITY |

FIG.14

| SETUP ITEM | CONTENT | WHETHER EXTERNAL VENDOR CAN BE CHANGED |
|---|---|---|
| REDIRECT DESTINATION URL | Redirect URL can be designated for the following cases: -authentication ticket is incorrect -unexpected error occurs in an authentication agent apparatus | × |
| HTTP HEADER INDICATIVE OF MFP | A designation is possible for a HTTP header such as User-Agent to know that an access is from a MFP. (A designation is possible using a normal expression.) | × |
| HEADER TO BE GIVEN | In a case where the authentication ticket is correct, it is possible to designate what header name is given to which information in giving the information to the HTTP header. | × |
| AUTHENTICATION TICKET NAME | It is possible to designate which name in Cookie is the authentication ticket. | × |
| AUTHENTICATION PLATFORM ADDRESS | URL of an authentication ticket inquiry destination (both http and https are available) | × |
| HTTPS SETUP | It is possible to set whether self-signature is ok or no check is done. | × |
| CACHE TIME | It is possible to designate a time of caching the authentication ticket. | × |
| PROTECTION EXCLUSION URL | It is possible to set a URL for which an access is immediately permitted without determining an authenticity of the authentication ticket. | ○ |

FIG.15

```
headers:
  tenant_id: X_TENANT_ID
  contract_end_date: X_CONTRACT_END_DATE
  ...
protocol: https
  mode: insecure
cache_time: 60
Signature: ABCDEF123456789123456789
```

FIG.17A

| HTTP HEADER NAME | CONTENT |
|---|---|
| X-Tenant-Id | TENANT ID |
| X-User-Id | USER ID |
| X-Last-Name | SURNAME |
| X-Role | ROLE (ADMINISTRATOR, ORDINARY USER) |
| X-Locale | LOCALE (DISPLAY LANGUAGE) |

FIG.17B

| HTTP HEADER NAME | CONTENT |
|---|---|
| X-Service-Class | SERVICE TYPE |
| X-Charge-Kind | CHARGE KIND |
| X-End-Date | CONTRACT END DATE (VALUE IS NOT ENTERED UNTIL CONTRACT ACTUALLY ENDS) |
| X-Service-Action | EXECUTABLE ACTION |
| X-No-Permission-Reason | REASON WHY THERE IS NO SERVICE AUTHORITY |

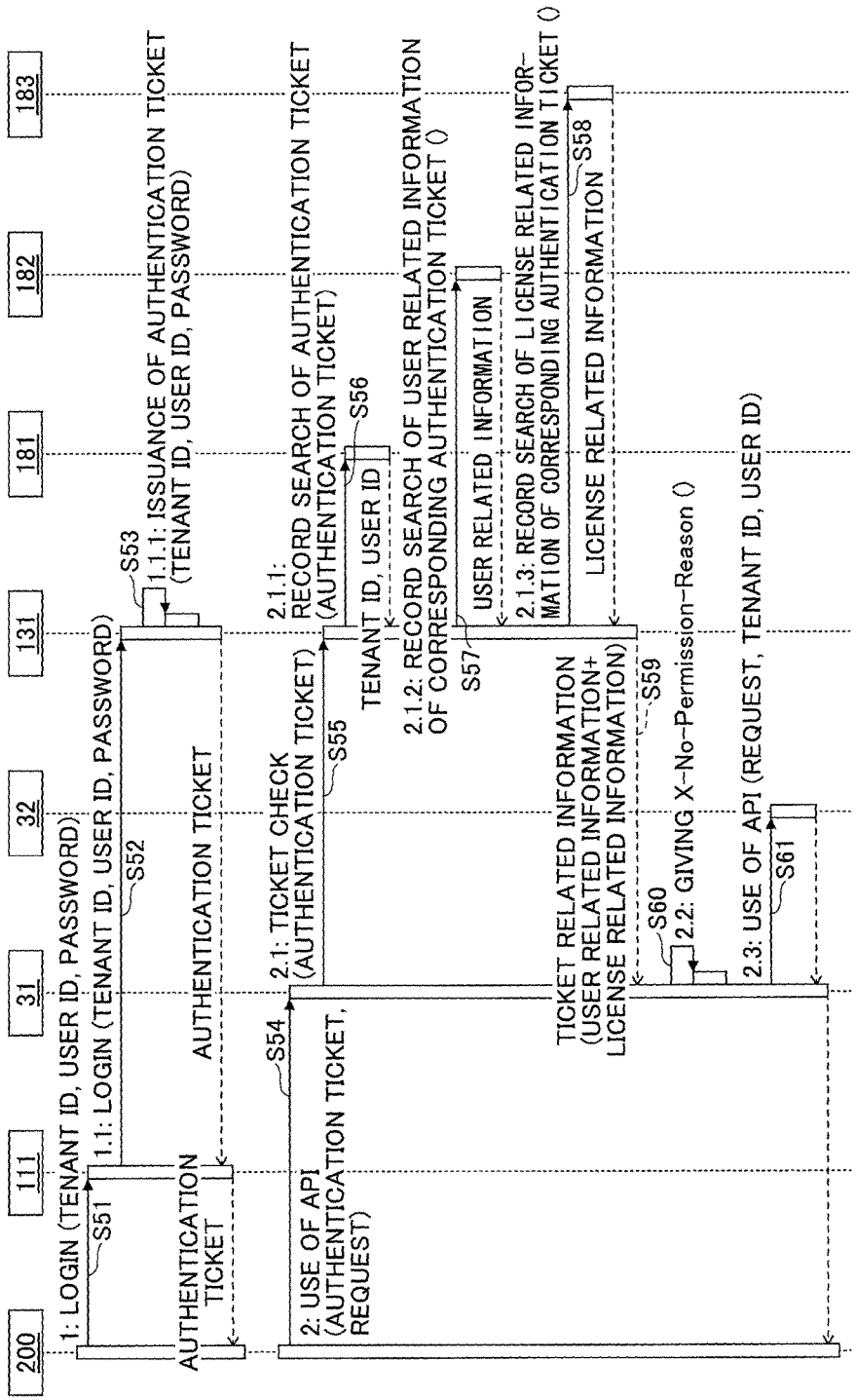

FIG.20

| X-End-Date | X-Charge-Kind | X-Service-Action | X-No-Permission-Reason |
|---|---|---|---|
| WITH VALUE | trial | – (NO OBJECT) | trial_expired (TRIAL DEADLINE IS EXPIRED) |
| WITH VALUE | for_sale | – (NO OBJECT) | expired (FORMAL CONTRACT DEADLINE IS EXPIRED) |
| WITHOUT VALUE | WITHOUT VALUE | WITHOUT VALUE | unsigned (CONTRACT IS NOT YET CONCLUDED) |
| WITHOUT VALUE | WITH VALUE | WITHOUT VALUE | no_permission (WITHOUT AUTHORITY) |

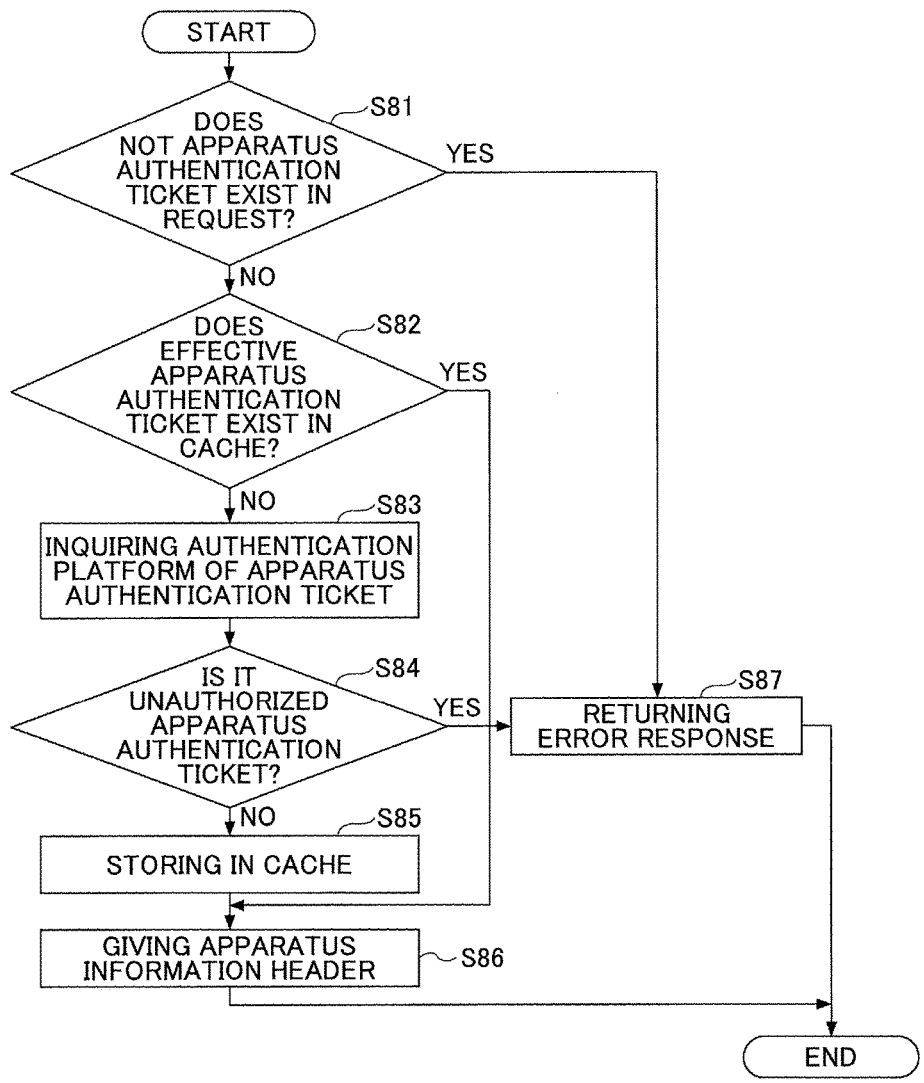

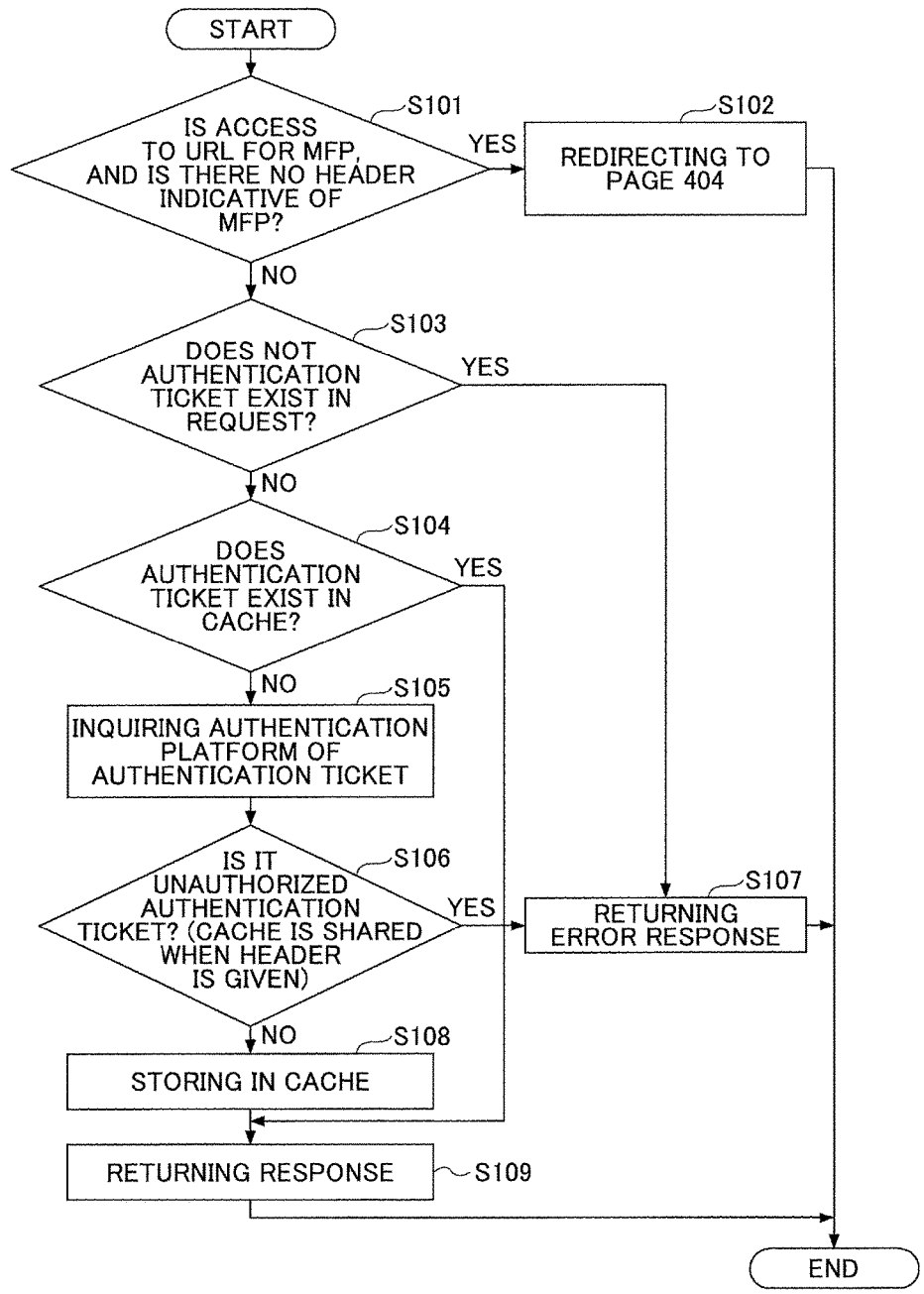

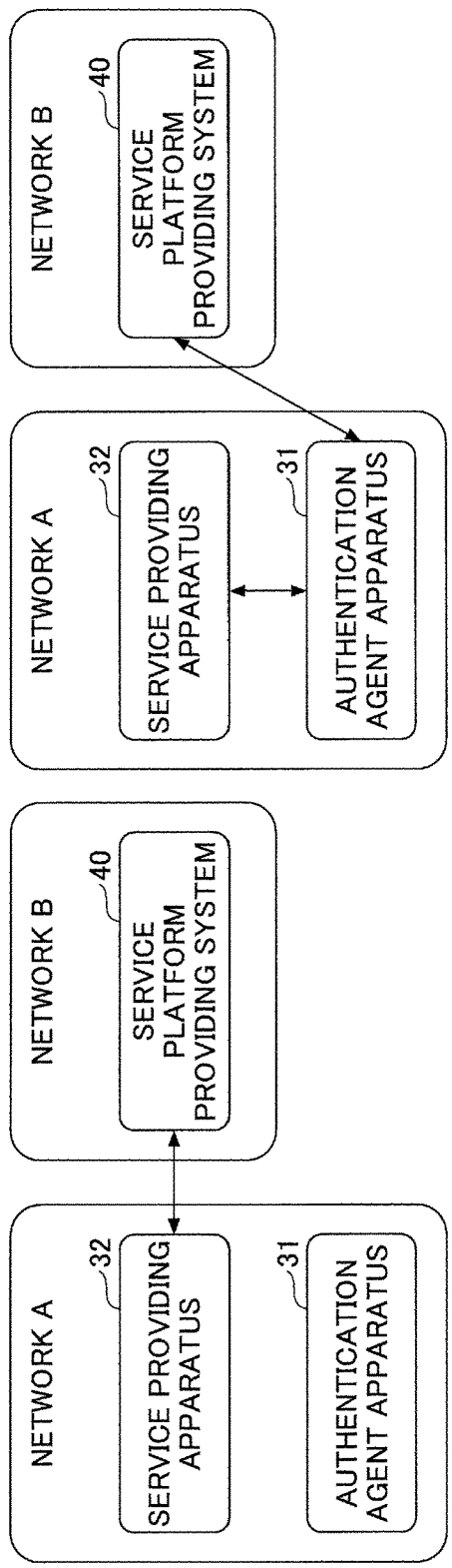

FIG.24

```
{"system": {
        "currentTime": "2014-06-24T15:00:00Z"
},
"user": {
        "tenantId": "601000001",
        "userId": "user0001",
        "lastName": "aaa",
        "firstName": "taroh",
        "loginMail": "user0001@example.com"
},
"service": {
        "license": {
                "serviceClass": "translate",
                "chargeKind": "trial",
                "contractEndDate": "2012-08-16T15:00:00Z"
        },
        "action": [
                "administer",
                "use"
        ]
    }
}
```

INFORMATION PROCESSING SYSTEM, INFORMATION PROCESSING APPARATUS, ACCESS CONTROL METHOD, AND PROGRAM

BACKGROUND OF THE INVENTION

1. Field of the Invention

The present invention relates to an information processing system, an information processing apparatus, an access control method, and a program.

2. Description of the Related Art

In a service provided by cloud computing and a service provided to a client operated by the user, an access control is performed by using an authentication ticket as an example.

An example of a service of a secure access to a resource protected in a user-friendly manner is provided to a permitted user through various networks including the Internet (see, for example, Patent Document 1).

Patent Document 1: Japanese Laid-Open Patent Publication No. 2006-31714

SUMMARY OF THE INVENTION

It is a general object of at least one embodiment of the present invention to provide an information processing system that substantially obviates one or more problems caused by the limitations and disadvantages of the related art.

One aspect of the embodiments of the present invention may be to provide an information processing system including at least one information processing apparatus that includes an access control unit configured to receive a request from a service use apparatus to a service providing apparatus, to give, in a case where the request includes information of a completed authentication, based on setup information in which a type of giving information to be given to the request is set, the giving information of the type set in the setup information, and to send the request to the service providing apparatus; and an information providing unit configured to administer the giving information corresponding to the information of the completed authentication, and to provide the giving information corresponding to the information of the completed authentication received from the access control unit to the access control unit.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

2. It is to be understood that both the foregoing general description and the following detailed description are exemplary and explanatory only and are not restrictive of the invention as claimed.

BRIEF DESCRIPTION OF THE DRAWINGS

FIG. 9 illustrates a structure of exemplary tenant information.

FIG. 10 illustrates a structure of exemplary user information.

FIG. 11 illustrates a structure of exemplary license information.

FIG. 12 illustrates a structure of exemplary activated apparatus view information.

FIG. 13 illustrates a structure of exemplary apparatus information.

FIG. 14 illustrates a structure of an exemplary setup item.

FIG. 15 is a structural view of an exemplary signed setup file.

FIG. 17A illustrates a structure of an exemplary identical person information header (an exemplary user information header).

FIG. 17B illustrates a structure of an exemplary identical person information header (an exemplary license information header).

FIG. 19 is a sequence charts of an exemplary access control using the user authentication ticket.

FIG. 20 illustrates how a value of HTTP header name "X-no-Permission-Reason" is given.

FIG. 21 is a flowchart of an exemplary access control using an apparatus authentication ticket.

FIG. 22 is a flowchart of an exemplary authentication agent API.

FIGS. 23A and 23B illustrate exemplary authentication agent APIs.

FIG. 24 illustrates an exemplary response of the authentication agent API.

DETAILED DESCRIPTION OF THE PREFERRED EMBODIMENTS

Figure 1:
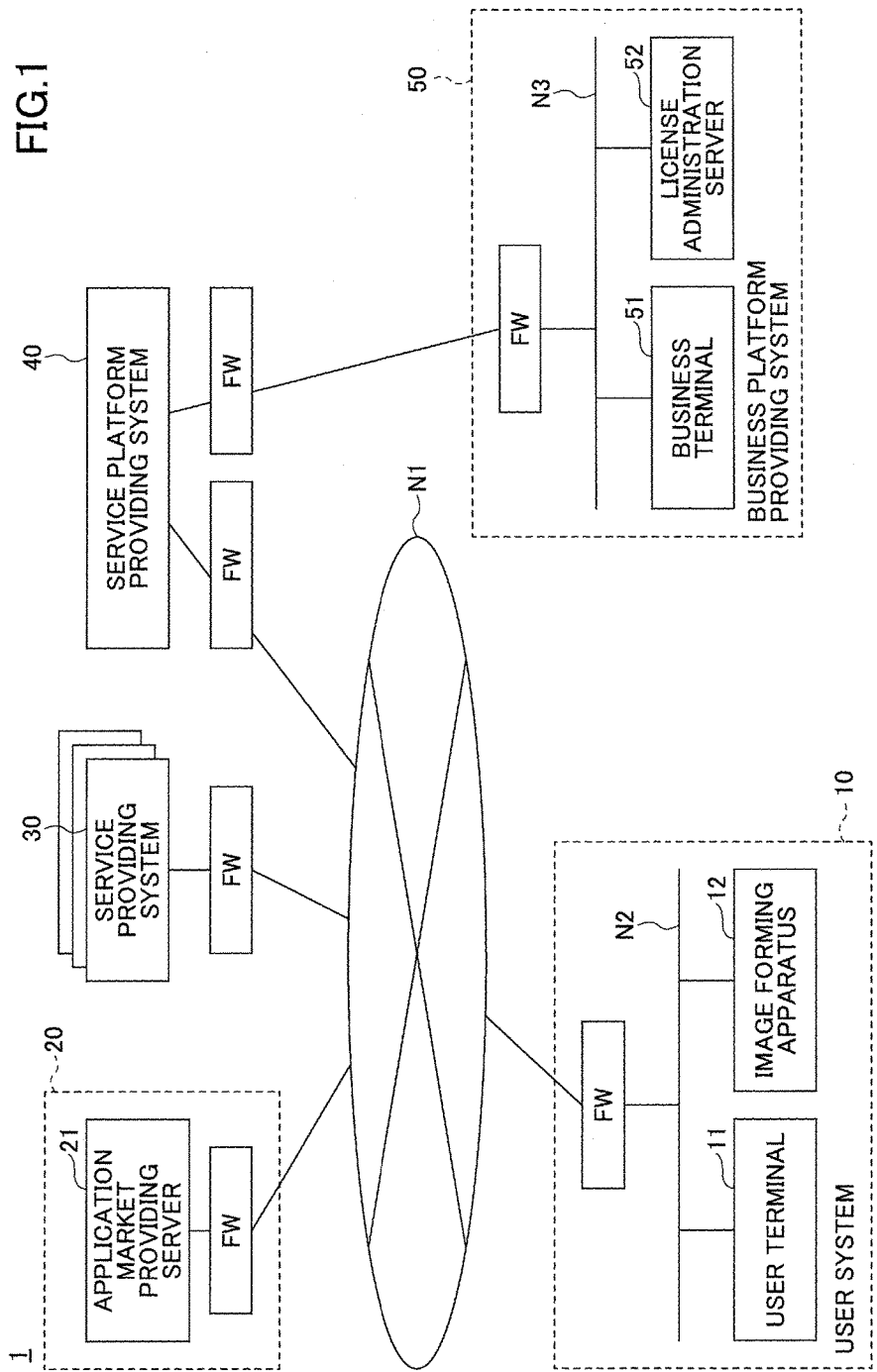
FIG. 1 illustrates a structure of an exemplary information processing system of a first embodiment.

An example of an access control apparatus performs an access control between a client operated by a user and a service providing apparatus providing a service using an authentication ticket. The access control apparatus performs an access control depending on whether an authorized authentication ticket exists in a request from the client to the service providing apparatus. The access control apparatus provides the request, in which the authorized authentication ticket exists, to the service providing apparatus.

Here, various information including information necessary for a determination of the authentication ticket and an authentication may be held by an apparatus other than an access control apparatus. Further, the service providing apparatus may require the use of various information held by the apparatus other than the access control apparatus so as to provide a service.

However, it is not preferable to provide a structure where the service providing apparatus can directly acquire various information held by other than the access control apparatus in terms of security.

A description is given below, with reference to the FIG. 1 through FIG. 25 of embodiments of the present invention. Where the same reference symbols are attached to the same parts, repeated description of the parts is omitted.

Reference symbols typically designate as follows:
1: information processing system;
10: user system;
11: user terminal;
12: image forming apparatus;
20: application market providing system;
21: application market providing server;
30: service providing system;
31: authentication agent apparatus;
32: service providing apparatus;
40: service platform providing system;
50: business platform providing system;
51: business terminal;
52: license administration server;
101: application;
102: common service;
103: database (DB);
104: platform application programming interface (API);
111: portal service application;
112: scan service application;
113: print service application;
114: account registration application;
121: scan service unit;
122: print service unit;
123: account registration unit;
131: authentication and permission unit;
132: tenant administration unit;
133: user administration unit;
134: license administration unit;
135: apparatus administration unit;
136: temporary image storing unit;
137: data storing unit;
138: image processing workflow control unit;
139: log collection unit;
141: message queue;
142: worker;
151: log information memory unit;
152: tenant information memory unit;
153: user information memory unit;
154: license information memory unit;
155: apparatus information memory unit;
156: temporary image memory unit;
157: job information memory unit;
158: setup information memory unit inherent in application;
200: client;
500: computer;
501: input device;
502: display device;
503: external I/F;
503a: recording medium;
504: RAM;
505: ROM;
506: CPU;
507: communication I/F;
508: HDD;
601: controller;
602: operation panel;
603: external I/F
603a: recording medium;
604: communication I/F;
605: printer;
606: scanner;
611: CPU;
612: RAM;
613: ROM;
614: NVRAM;
615: HDD;
B: bus;
FW: firewall; and
N1-N3: network.

First Embodiment

<System Structure>

FIG. 1 illustrates a structure of an exemplary information processing system of a first embodiment. The information processing system 1 includes a user system 10, an application market providing system 20, a service providing system 30, a service platform providing system 40, and a business platform providing system 50.

The user system 10, the application market providing system 20, the service providing system 30, and the service platform providing system 40 are connected through a network N1 such as the Internet. Further, the service platform providing system 40 and the business platform providing system 50 are connected through a private line or the like.

The network N2 of the user system 10 is a private network existing inside the firewall FW. The firewall FW detects and shuts off an unauthorized access. A user terminal 11 and an image forming apparatus 12 such as a multifunction peripheral are connected to the network N2. The image forming apparatus 12 is an example of an electronic apparatus by which a user does a trial use of a service.

The user terminal 11 can be substantialized by an information processing apparatus, in which an ordinary operating system (OS) or the like is installed. The user terminal 11 includes a wired or wireless communication means. The user terminal 11 is a smartphone, a mobile phone, a tablet terminal, and a PC, which are operable by the user.

The image forming apparatus 12 is an apparatus having an image forming function such as a multifunction peripheral. The image forming apparatus 12 includes a wireless or wired communication means. The image forming apparatus 12 is an apparatus of performing processes related to image formation such as a multifunction peripheral, a copier, a scanner, a printer, a laser printer, a projector, and an electronic blackboard. Referring to FIG. 1, the number of the user terminal 11 and the number of the image forming apparatus 12 are respectively one, for example. However, the numbers of the user terminal 11 and the image forming apparatus 12 may be respectively plural.

An application market providing server 21 of the application market providing system 20 is connected to the network N1 through a firewall FW. The application market providing server 21 is substantialized by at least one information processing apparatus in which an ordinary OS or the like is installed.

The application market providing system 20 may be provided for each sales region or each sales company. The application market providing server 21 provides an application market screen such as a service view screen and a subscription screen to the user terminal 11 and the image forming apparatus 12.

The service providing system 30 is connected to the network N1 through the firewall FW. The service providing system 30 provides various services to the user terminal 11 and the image forming apparatus 12. The service providing system 30 is substantialized by at least one information processing apparatus in which an ordinary OS or the like is installed. The services provided by the service providing system 30 is not only a service provided by an operator of the service platform providing system 40 but also a service provided by an external service provider or the like.

The service platform providing system 40 is connected to the network N1 through the firewall FW. The service platform providing system 40 is substantialized by at least one information processing apparatus in which an ordinary OS or the like is installed.

The service platform providing system 40 can perform functions such as authentication and permission, a tenant administration, a user administration, a license administration, an account registration, or the like. The service platform providing system 40 receives a request for the account registration or a request for the login from the user terminal 11 or the image forming apparatus 12. The service platform providing system 40 receives a confirmation request for confirming an authentication ticket and an acquisition request for acquiring user information from the service providing system 30.

A network N3 of the business platform providing system 50 is a private network existing inside of a firewall FW. A business terminal 51 and a license administration server 52 are connected to the network N3. The business terminal 51 and the license administration server 52 may be substantialized by at least one information processing apparatus, in which an ordinary OS or the like is installed.

The business terminal 51 includes a wired or wireless communication means. The business terminal 51 is a smartphone, a mobile phone, a tablet terminal, and a PC, which are operable by a business controller. The business controller can use the business terminal 51 to request the license administration server 52 to issue a license.

The license administration server 52 may perform a function such as a license administration. The license administration server 52 receives a request for issuing the license from the service platform providing system 40 and the business terminal 51. The structure of the information processing system 1 is an example and may be another structure.

<Hardware Structure>

Figure 2:
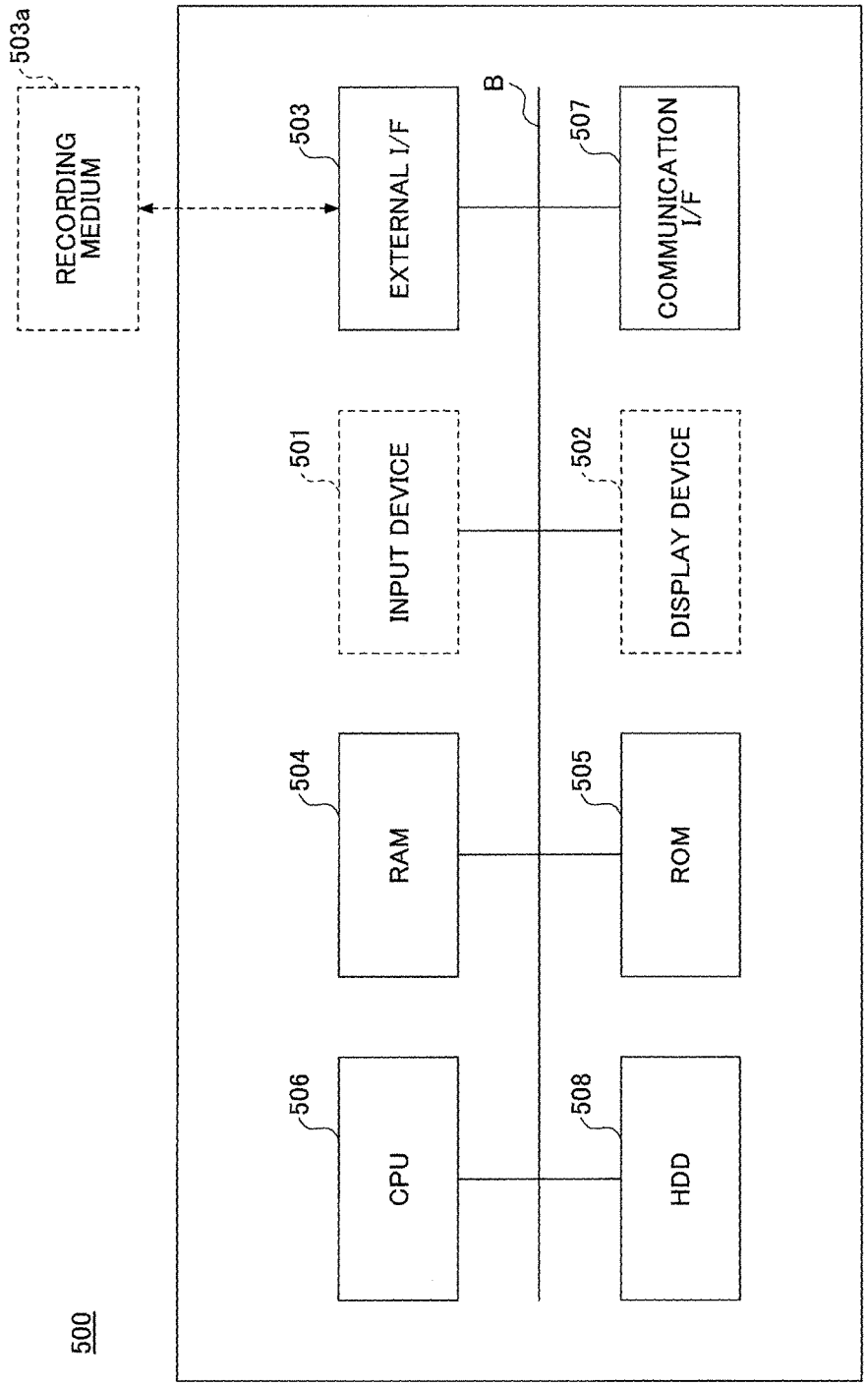
FIG. 2 illustrates a hardware structure of an exemplary computer of the first embodiment.

The user terminal 11, the application market providing server 21, the business terminal 51, and the license administration server 52 are substantialized by a computer having a hardware structure as illustrated in, for example, FIG. 2. Further, the information processing apparatus substantializing the service providing system 30 and the service platform providing system 40 is substantialized by a computer having a hardware structure illustrated in, for example, FIG. 2. FIG. 2 illustrates an exemplary hardware structure of the computer of the first embodiment.

Referring to FIG. 2, the computer 500 includes an input device 501, a display device 502, an external I/F 503, a RAM 504, a ROM 505, a CPU 506, a communication I/F 507, a HDD 508, and so on. In the computer 500, the input device 501, the display device 502, the external I/F 503, the RAM 504, the ROM 505, the CPU 506, the communication I/F 507, the HDD 508, and so on are mutually connected by a bus B. It is acceptable to structure such that the input device 501 and the display device 502 are connected when necessary.

The input device 501 includes a keyboard, a mouse, or the like, by which the user inputs various operation signals. The display device 502 includes a display or the like to display a processing result obtained by the computer 500.

The communication I/F 507 is an interface provided to connect the computer 500 with the networks N1, N2, and N3. Thus, the computer 500 can perform data communications through the communication I/F 507.

The HDD 508 is a non-volatile memory device storing programs and/or data. The program and/or data to be stored are an OS being basic software controlling the entire computer 500, application software providing various functions in the OS, and so on.

The external I/F 503 is an interface with an external apparatus. The external apparatus is a recording medium 503a or the like. With this, the computer 500 can read information from the recording medium 503a and/or write information to the recording medium 503a through the external I/F 503. The recording medium 503a is a flexible disk, a CD, a DVD, an SD memory card, a USB memory, or the like.

The ROM 505 is a non-volatile semiconductor memory (a memory device), which can hold a program and/or data even when a power source is powered off. The ROM 505 stores programs and data for a basic input/output system (BIOS), an OS setup, a network setup, and so on, which are executed at a time of booting up the computer 500. The RAM 504 is a volatile semiconductor memory temporarily storing a program or data.

The CPU 506 is an arithmetic device that reads the program and/or the data from the memory device such as the ROM 505, the HDD 508, or the like. The read program or the read data undergo a process so as to substantialize a control or a function of the entire computer 500.

The user terminal 11, the application market providing server 21, the business terminal 51, and the license administration server 52 of the first embodiment may perform various processes described below by the above hardware structure of the computer 500. Further, the information processing apparatus substantializing the service providing system 30 and the service platform providing system 40 can perform various processes described below by the above hardware structure of the computer 500.

Figure 3:
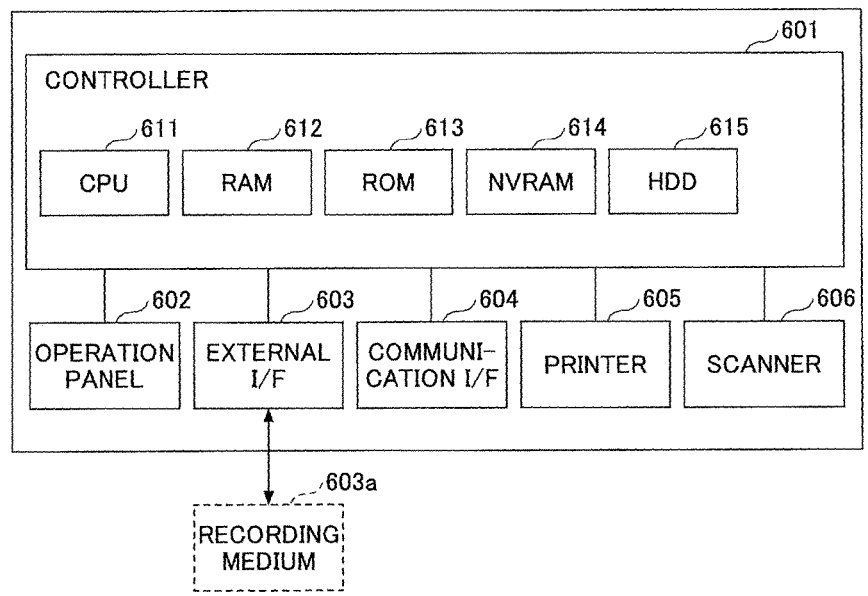
FIG. 3 illustrates a hardware structure of an exemplary image forming apparatus of the first embodiment.

The image forming apparatus 12 illustrated in FIG. 1 is substantialized by a computer having a hardware structure illustrated in, for example, FIG. 3. FIG. 3 illustrates an exemplary hardware structure of the image forming apparatus of the first embodiment. The image forming apparatus 12 illustrated in FIG. 3 includes a controller 601, an operation panel 602, an external I/F 603, a communication I/F 604, a printer 605, a scanner 606, and so on.

The controller 601 includes a CPU 611, a RAM 612, a ROM 613, a NVRAM 614, a HDD 615, and so on. Various programs and data are stored in the ROM 613. The RAM 612 temporarily stores the program and the data. Setup information or the like is stored in the NVRAM 614. Various programs and data are stored in the HDD 615.

The CPU 611 reads the program, the data, setup information, or the like into the RAM 612 from the ROM 613, the NVRAM 614, the HDD 615, or the like, and performs the process. Thus, the CPU 611 substantializes an entire control or functions of the information forming apparatus 12.

The operation panel 602 includes an input unit for receiving an input from the user and a display unit for a display. The external I/F 603 is an interface with an external apparatus. The external apparatus is a recording medium 603a or the like. With this, the output device 14 can read information from the recording medium 603a and/or write information to the recording medium 603a through the external I/F 603.

The recording medium 603a is an IC card, a flexible disk, a CD, a DVD, an SD memory card, a USB memory, or the like.

The communication I/F 604 is an interface provided to connect the image forming apparatus 12 with the network N1. Thus, the image forming apparatus 12 can perform data communications through the communication I/F 604. The printer 605 is provided for printing print data on a print paper. The scanner 606 is an apparatus for reading image data (electronic data) from an original manuscript. A description of the hardware structure of the firewall FW, which are illustrated in FIG. 1, is omitted.

<Software Structure>
<<Service Providing System>>

Figure 4:
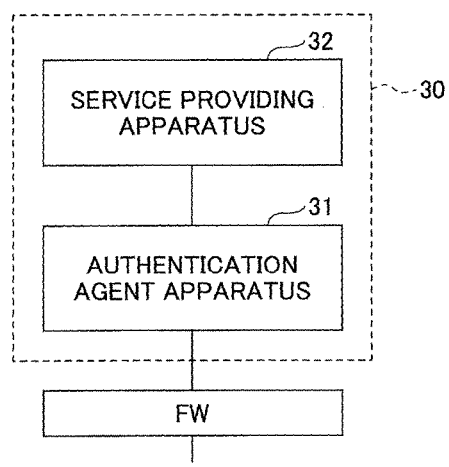
FIG. 4 illustrates a structure of an exemplary service providing system of the first embodiment.

The service providing system 30 of the first embodiment is substantialized by, for example, a structure illustrated in FIG. 4. FIG. 4 illustrates a structure of an exemplary service providing system of the first embodiment. The service providing system 30 illustrated in FIG. 4 has a structure including an authentication agent apparatus 31 and a service providing apparatus 32.

The authentication agent apparatus 31 receives various requests from the user terminal 11 and the image forming apparatus 12 to the service providing apparatus 32. The authentication agent apparatus 31 performs an access control by sending the request, which includes an authorized authentication ticket issued by the service platform providing system 40 and sent from the user terminal 11 or the image forming apparatus 12, to the service providing apparatus 32.

The authentication agent apparatus 31 redirects a request, which does not includes an authorized authentication ticket and sent from the user terminal 11 and the image forming apparatus 12, to the service platform providing system 40. As such, the authentication agent apparatus 31 sends the request from the user terminal 11 or the image forming apparatus 12 to the service providing apparatus 32 after causing the authorized authentication ticket to be acquired by the user terminal or the image forming apparatus 12.

The service providing apparatus 32 provides a service in response to the request from the user terminal 11 or the image forming apparatus 12. The service providing apparatus 32 inquires the authenticity of the authentication ticket or requests to acquire information necessary to provide the service of the service platform providing system 31.

An example of the service provided by the service providing apparatus 32 is a translation service. The image forming apparatus 12 performs an optical character recognition (OCR) for image data obtained by scanning from an original manuscript. Thereafter, the OCR data are sent to the service providing apparatus 32 and the translation service provided by the service providing apparatus 32 can be used for the OCR data.

The service providing apparatus 32 may acquire user information as information necessary for providing the translation service and cause the translation result to include the user information. The user may browse the translation result by accessing the service providing apparatus 32 from, for example, the user terminal 11 or receive the translation result using an email.

<<Service Platform Providing System>>

Figure 5:
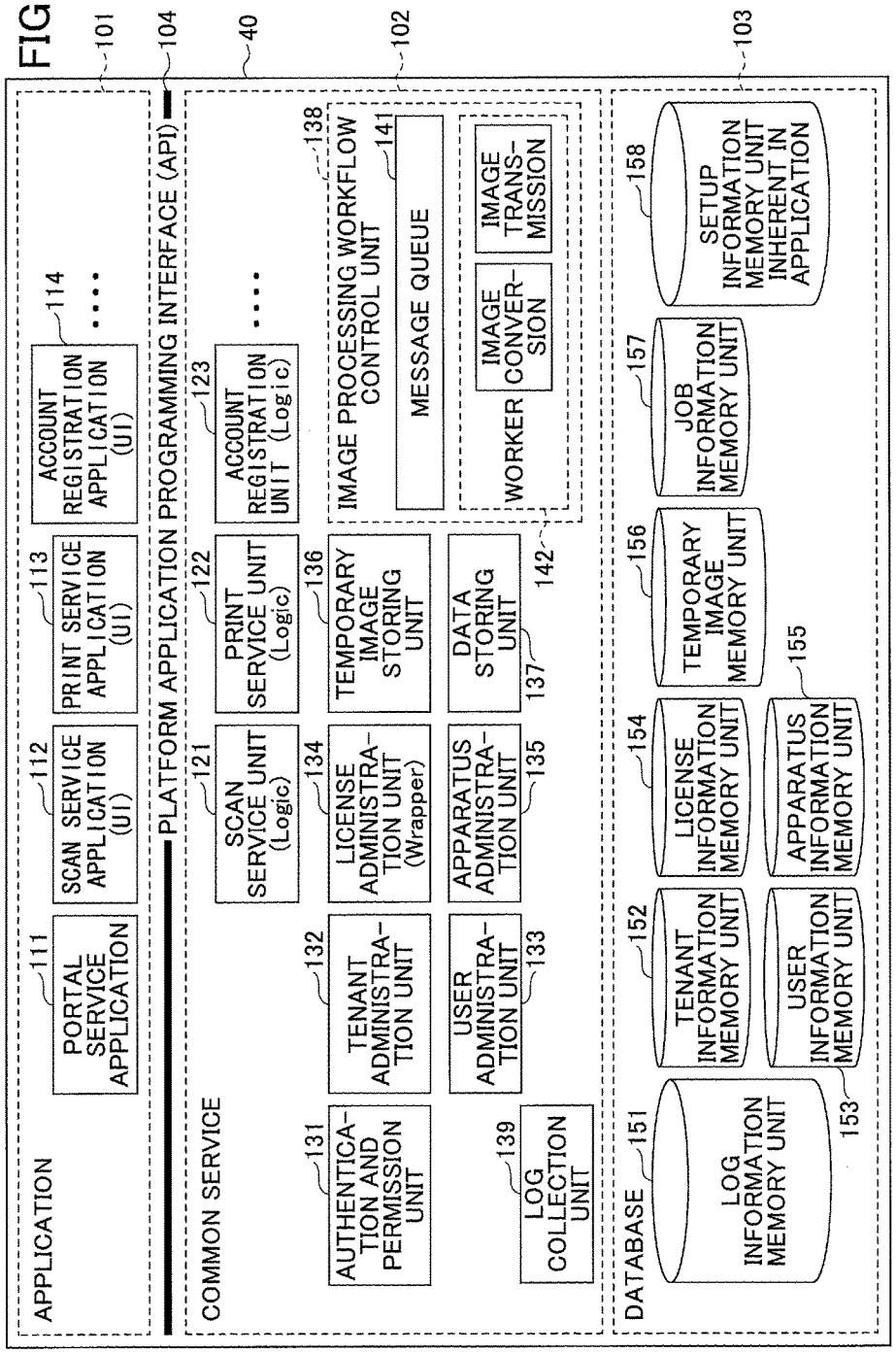
FIG. 5 is a processing block chart of an exemplary service platform providing system of the first embodiment.

The service platform providing system 40 of the first embodiment is substantialized by, for example, a processing block illustrated in FIG. 5. FIG. 5 is a processing block chart of an exemplary service platform providing system of the first embodiment. The service platform providing system 40 substantializes the processing block illustrated in FIG. 5 by executing the program.

Referring to FIG. 5, the service platform providing system 40 substantializes (includes) an application 101, a common service 102, a database (DB), and a platform API 104.

The application 101 includes, for example, a portal service application 111, a scan service application 112, a print service application 113, and an account registration application 114.

The portal service application 111 is an application providing a portal service. The portal service provides a service as an entrance for using the information processing system 1. The scan service apparatus 112 is a user interface (UI) of the application for providing a scan service.

The print service application 113 is a UI of an application providing a print service. The account registration application 114 is a UI of an application providing an account registration service. The application 101 may include another service application.

The UIs of the scan service application 112, the print service application 113, and the account registration application 114 may include Native application displayed or executed by the user terminal 11 or the image forming apparatus 12 or HTML/JavaScript data ("JavaScript" is a registered trademark). The Native application can be compared with the Web application, and a major process of the Native application is performed by the user terminal 11 and the image forming apparatus 12. Meanwhile, a major process of the Web application is performed by the service platform providing system 40.

The platform application programming interface (API) 104 is an interface used by the application 101 such as a portal service application 101 when the application 101 uses the common service 102.

The platform API 104 is an interface previously defined so that the common service 101 receives a request from the application 101. The platform API 104 is structured by, for example, a function, a class, or the like. The platform API 104 can be substantialized by, for example, a Web API, which can be used through the network, when the service platform providing system 40 is structured by multiple information processing apparatuses.

The common service 102 includes a scan service unit 121, a print service unit 122, an account registration unit 123, an authentication and permission unit 131, a tenant administration unit 132, a user administration unit 133, a license administration unit 134, an apparatus administration unit 135, a temporary image storing unit 136, a data storing unit 137, an image processing workflow control unit 138, and a log collection unit 139. The image processing workflow controlling unit 138 includes a message queue 141 and at least one worker (Worker) 142. The worker 142 substantializes a function such as an image conversion or an image transmission.

The scan service unit 121 functions as a logic (API) of the scan service application 112. The print service unit 122 functions as a logic (API) of the print service application 113.

The account registration unit 123 functions as a logic (API) of the account registration application 114.

The authentication and permission unit 131 performs authentication and/or permission based on a login request received from an office apparatus such as the client terminal 11, the image forming apparatus 12, or the like. The office apparatus collectively designates the user terminal 11, the image forming apparatus 12, or the like.

The authentication and permission unit 131 accesses, for example, a user information memory unit 153, a license information memory unit 154, or the like, which are described below, and authenticates and/or permits the user. Further, the authentication and permission unit 131 accesses, for example, a tenant information memory unit 152 described below, the license information memory unit 154, the apparatus information memory unit 155, or the like to perform a client authentication of the image forming apparatus 12 or the like.

The tenant administration unit 132 administers tenant information stored in the tenant information memory unit 152 described below. The user administration unit 133 administers the user information stored in the user information memory unit 153 to be described below.

The license administration unit 134 administers the license information stored in the license information memory unit 154 described below. The apparatus administration unit 135 administers apparatus information stored in the apparatus information memory unit 155 described below. The temporary image storing unit 136 stores a temporary image in a temporary image memory unit 156 described below and acquires the temporary image from the temporary image memory unit 156. The data storing unit 137 stores data in a job information memory unit 157 described below.

The image processing workflow control unit 138 controls a workflow related to image processing based on a request from the application 101. The message queue 141 includes queues corresponding to types of the processes. The image processing workflow control unit 138 inputs a message of a request related to a process (a job) into the queue corresponding to the type of the job.

The worker 142 monitors the corresponding queue. When the message is input in the queue, the worker 142 performs a process such as an image conversion or an image transmission corresponding to the type of the job. The message input to the queue may be mainly read out (Pull) by the worker 142, or may be provided (Push) from the queue to the worker 142. The log collection unit 139 causes the corrected log information to be stored in, for example, a log information memory unit 151 described below.

The database 103 includes a log information memory unit 151, an tenant information memory unit 152, a user information memory unit 153, a license information memory unit 154, an apparatus information memory unit 155, a temporary image memory unit 156, a job information memory apparatus 157, and a setup information memory unit inherent in application 158.

The log information memory unit 151 stores log information. The tenant information memory unit 152 stores tenant information described below. The user information memory unit 153 stores user information described below. The license information memory unit 154 stores license information described below. The apparatus information memory unit 155 stores apparatus information described below. The temporary image memory unit 156 stores a temporary image. The temporary image is a file or data such as a scanned image processed by, for example, the worker 142.

The job information memory unit 157 stores information (job information) of the request related to a process (a job). The setup information memory unit 158 inherent in the application stores setup information inherent in the application 101.

The service platform providing system 40 functions as an integrated platform for providing a common service such as the authentication and permission or a workflow related to image processing and a service group for providing an application service such as a scan service, a print service, or the like.

The integrated platform is structured by, for example, the common service 102, the database 103, and the platform API 104. Further, the service group is formed by, for example, the application 101. As described, in the service platform providing system 40 illustrated in FIG. 5, the service group is separated from the integrated platform.

In the service platform providing system 40 illustrated in FIG. 5, by adopting the structure where the service group and the integrated platform are separated, it is possible to easily develop the application 101 using the platform API 104. The service platform providing system 40 illustrated in FIG. 5 can easily develop the service providing apparatus 32 using the platform API 104.

A mode of classifying the processing blocks of the service platform providing system 40 illustrated in FIG. 5 is an example. It is unnecessary that the application 101, the common service 102, and the database 103 are classified in a hierarchy illustrated in FIG. 5. As long as the processes of the service platform providing system 40 of the first embodiment can be performed, a relationship of the hierarchy illustrated in FIG. 5 is not specifically limited.

<<Arrangement of UI and Logic>>

Figure 6:
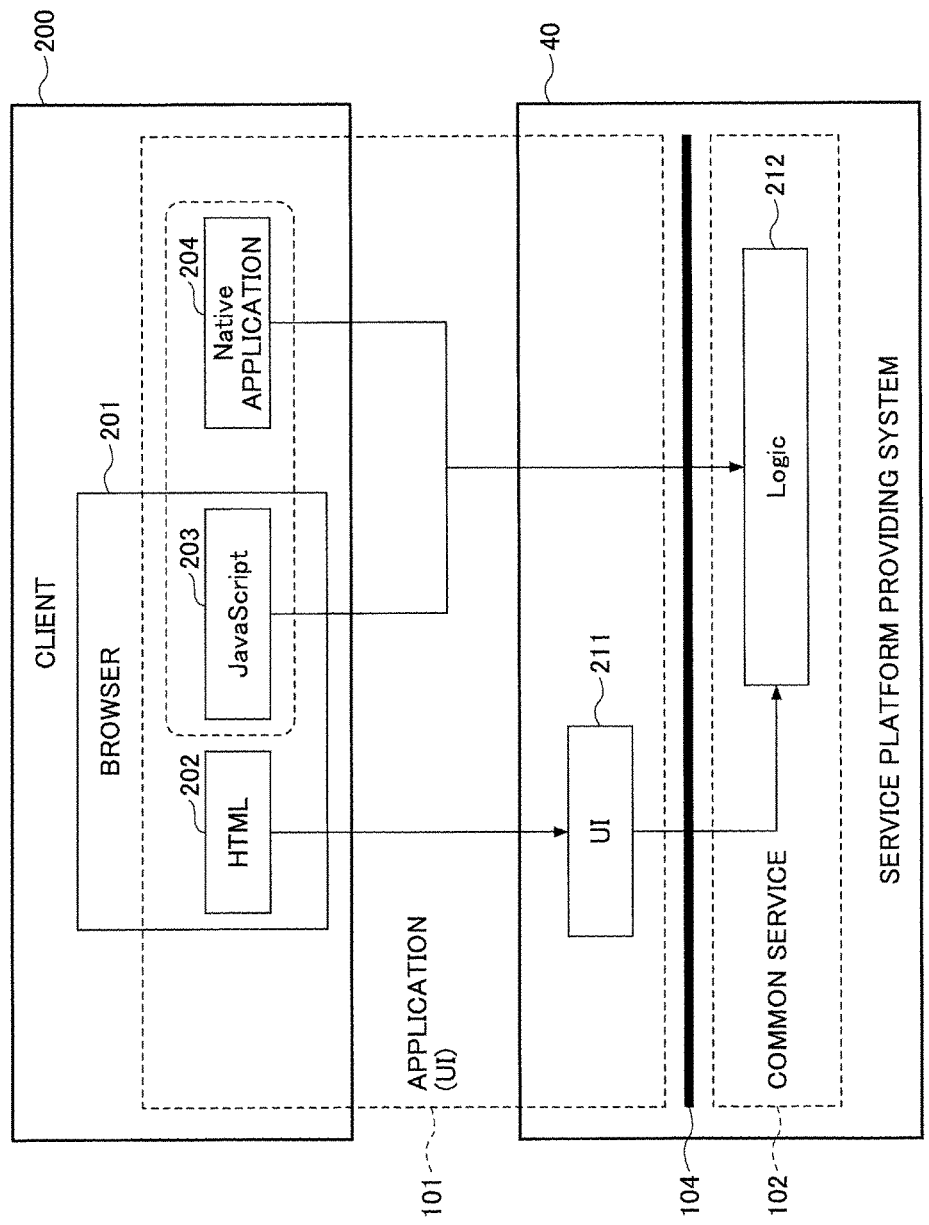
FIG. 6 illustrates an exemplary arrangement of a UI and a logic (API).

In the service platform providing system 40 illustrated in FIG. 5, a UI or a login (API) of the application 101 such as the scan service application 112 receives an access from a client 200 such as the user terminal 11 and the image forming apparatus 12 as illustrated in FIG. 6. FIG. 6 illustrates an exemplary arrangement of the UI and the logic (API) of the first embodiment.

The UI 211 of the service platform providing system 40 illustrated in FIG. 6 interprets a user operation performed in the client 200, calls a logic 212 from the platform API 104, and generates HTML data 202. A browser 201 of the client 200 changes a screen by the HTML data 202 generated on a side of the service platform providing system 40.

The browser 201 may use a single page Web application (SPA). The browser 201 of the client 200 downloads HTML/JavaScript/CSS data from the service platform providing system 40. The browser 201 calls the logic 212 of the service platform providing system 40 using JavaScript data by, for example, Ajax and may change the screen by a DOM operation.

Here, Ajax stands for Asynchronous JavaScript+XML. Ajax is an example of an implementation mode of a Web application which uses an HTTP communication function of JavaScript installed in the browser and performs a process without reloading the web page. The DOM operation is an exemplary operation of accessing values of each element of the HTML data and dynamically overwriting.

The client 200 may use a Native application 204 installed in a NativeOS. The Native application 204 interprets the user operation on the side of the client 200, calls the logic 212, and changes the screen depending on the result.

Referring to FIG. 6, the UI 211 of the service platform providing system 40 calls the logic 212 from the platform API 104. In a manner similar thereto, the UI of the service providing system 30 may call the logic 212 from the platform API 104.

<<Access Control Using Authentication Ticket>>

Figure 7:
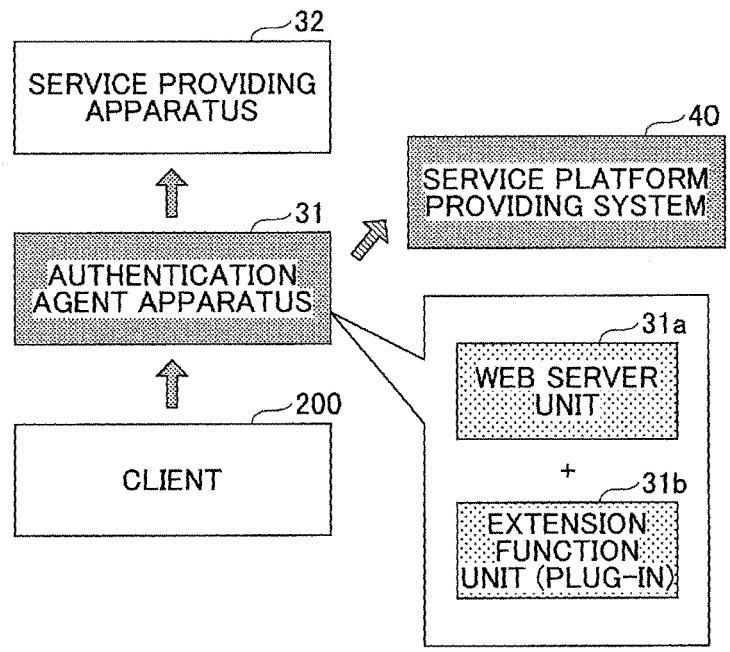
FIG. 7 illustrates an exemplary access control using an authentication ticket.

Referring to FIG. 7, the authentication agent apparatus 31 collaborates with the service platform providing system 40 so as to perform an access control from the client 200 to the service providing apparatus 32 using the authentication ticket. FIG. 7 illustrates an exemplary access control using an authentication ticket.

Referring to FIG. 7, the access from the client 200 to the service providing apparatus 32 is performed through the authentication agent apparatus 31. The authentication agent apparatus 31 is formed by, for example, a Web server unit 31a and an extension function unit 31b such as a plug-in. In a case where a service provided by the service providing apparatus 32 is used by the client 200, the user requests the service providing system 30 from the client 200.

The authentication agent apparatus 31 of the service providing system 30 protects the service providing apparatus 32 using the authentication ticket by not sending a request, which does not includes the authorized authentication ticket, to the service providing apparatus 32. For example, the Web server unit 31a of the authentication agent apparatus 31 designates a path required to be protected by the authentication ticket.

The authentication ticket includes, for example, a user authentication ticket and an apparatus authentication ticket. If the request is for the path required to be protected by the user authentication ticket, the authentication agent apparatus 31 designates the extension function unit 31b performing the protection of the service providing apparatus 32. If the request is for the path required to be protected by the user authentication ticket, the authentication agent apparatus 31 designates the extension function unit 31b performing the protection of the service providing apparatus 32.

As described, the authentication agent apparatus 31 performs the protection of the service providing apparatus 32 using the authentication ticket. The authentication agent apparatus 31 can designates a path (an image file, a login page, a terms of use page, or the like), which is not required to protect, as a protection exclusion path in addition to the path (a path whose display is switched over for each user), which is required to protect, in the Web server unit 31a.

The user operating the client 200 performs a login process for the service platform providing system 40 and acquires the authorized authentication ticket. The client 200 sends a request including the authorized authentication ticket which is acquired to the service providing system 30. The authentication agent apparatus 31 of the service providing system 30 inquires the authenticity of the authentication ticket included in the request from the client 200 of the service platform providing system 40.

In a case where it in necessary to add information to the request from the client, the authentication agent apparatus 31 inquires the information and adds the information to a HTTP header of the service platform providing system 40.

The service providing apparatus 32 provides a service (a xx service) in response to a request from the client 200. The service providing apparatus 32 provides a service in response to a request from the client 200 by using the information added to the HTTP head or the like.

<<Authentication Agent API>>

Figure 8:
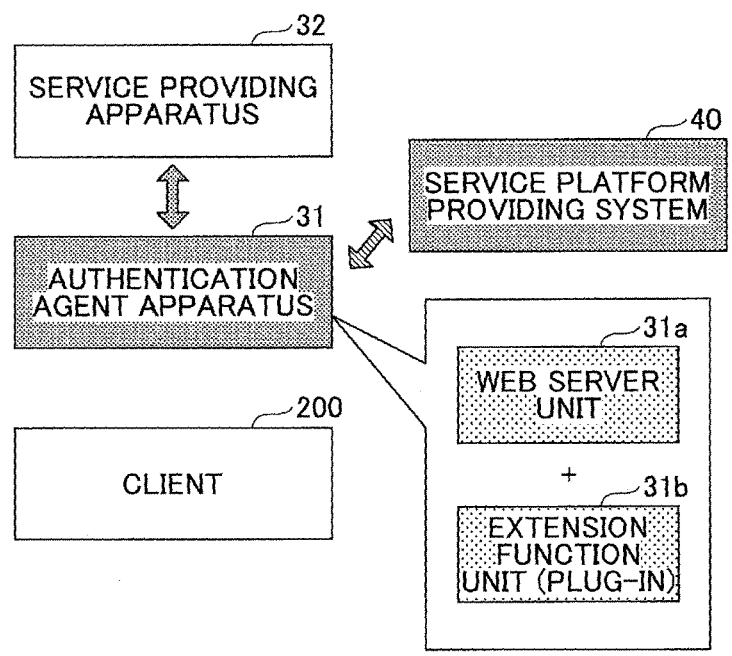
FIG. 8 illustrates an exemplary authentication agent API.

The authentication agent apparatus 31 provides an authentication agent API which acquires information from the service platform providing system 40 and make the authentication agent API public to the service providing apparatus 32. FIG. 8 illustrates an exemplary authentication agent API. The service providing apparatus 32 acquires the information from the service platform providing system 40 through the authentication agent apparatus 31 by using the authentication agent API.

Therefore, it becomes unnecessary for the service providing apparatus 32 to directly acquire the information from the service platform providing system 40. Therefore, the service platform providing system 40 needs not to directly receive an inquiry from the service providing apparatus 32, to make the API for receiving the information public, and to deal with a cross domain.

<<Information>>

FIG. 9 illustrates a structure of exemplary tenant information. Data items of the tenant information illustrated in FIG. 9 are a tenant ID, a tenant name, a display language, a time zone, a state, a country, and so on.

The tenant ID is information uniquely specifying groups (organizations) such as companies, departments, or the like. The tenant ID is not limited to a meaning of the tenant and may be information for identifying, for example, a contract. The tenant ID is uniquely determined.

The tenant name represents the name of the group such as the company or the department. The display language represents a language used for displaying the group name such as the company and the department. The display language represents a displayed language for an access from a browser and a language used for a body text of a mail. The time zone represents a standard time used by the group such as the company or the department. The state represents a state of the group such as the company or the department. The country represents the name of the country, to which the group such as the company or the department belongs.

FIG. 10 illustrates a structure of exemplary user information. The user information illustrated in FIG. 10 includes the tenant ID, a user ID, a mail address, a password, a user name, the display language, the time zone, the state, and so on.

The mail address and the password are an example of information (user specifying information) for specifying the user. The user specifying information may be the user ID or the user name instead of the mail address. The password is not indispensable.

The mail address needs to be unique. Further, the user ID administered using the same tenant ID needs to be unique. The user IDs administered using different tenant IDs may overlap.

Further, identification information of an electronic medium (for example, an IC card) owned by the user may be used as the user specifying information. The electronic medium owned by the user may be an IC card, a mobile phone, a tablet terminal, an electronic book reader, or the like. Information identifying the electronic medium is a card ID, a serial ID, a telephone number of the mobile phone, profile information of a terminal, or the like. It is possible to combine the information identifying the electronic medium in using the information identifying the electronic medium.

The mail address is a mail address of the user. The display language represents a language for displaying the user name. The display language represents a displayed language for an access from a browser and a language used for a body text of a mail. The time zone represents a standard time used by the user. The state represents the state of the user.

FIG. 11 illustrates a structure of exemplary license information. Data items of the license information are a service type, a license ID, a sales region, a country, a time zone, a commodity code, a quantity (the number of apparatuses), a use start date, a billing start date, a use end date, a scheduled cancellation date, a state, a parent service type, a parent license ID, a registration code, a machine type and machine number, a next license type, a next license ID, a license type, a license mode, a quantity (the number of users), the number of apparatuses in use, the number of users in use, a contract mode, and so on.

The service type is information for specifying a type of the service such as a portal service, a scan service, a print service, or the like. The license ID is identification information for identifying a license of a formal contract and a license (a trial license) for a trial use. The license ID is the tenant ID in a case where the license is the tenant license, and is the service ID in a case where the license is the service license.

The sales region is information indicative of a region where the license is sold. The country indicates the country name where the license is used. The time zone indicates a standard time of the country where the license is used. The commodity code is identification information for identifying a commodity corresponding to the license. The quantity (the number of assemblies) is information indicative the quantity of the apparatuses where the service can be used by the license.

The use start date is information indicative of a date when the license is activated. The billing start date is information indicative of a date when billing is started and the same date as the use start date or later (for example, the first day of the next month). The use end date is information indicative of a license deadline, and, for example, one year after the billing start date. The scheduled cancellation date is information indicative of a date when the license is inactivated. The state is information indicative of a state of the license. The state of the license includes, for example, a provisional registration indicating that the license before use, a registration indicating that the license is now being used, and a cancellation indicating that the license is after use.

In a case of the service license, the tenant is set to the parent service type. In a case of the service license, the tenant ID is set to the parent license ID. In a case of the tenant license, the registration code is set. The registration code is input at a time of opening the tenant.

The machine type and machine number is set in the case of the service license. The machine type and the machine number is information specifying the apparatus as an object of the license. In case of a volume license where multiple apparatuses to be licensed exist, the machine type and machine number of the apparatus activated the earliest is set.

The next license type is set in a case of the updated service license. The next service type has the same value as the service type. The next license ID is set in a case of the updated service license. The next license ID is a service ID of the license to be activated after completing the use of the updated service license.

The license type is information for specifying the type of the service license such as the apparatus license or the user license. The license type is information for setting the apparatus, the user, or the like, which are an object of limiting the use, by the service license. The license mode is information indicative of whether the use is permitted with the own service license in combination with the service license of another type or the use is permitted with only the own service license.

For example, the information such as "only the apparatus license" or "apparatus license+user license" is set to the license mode. In a case where the license mode is "only the apparatus license", the use of the service is permitted when the service license whose license type is "the apparatus license" is registered. In a case where the license mode is "the apparatus license+the user license", the use of the service is permitted when the service license whose license type is "the apparatus license" and the service license whose license type is "the user license" are registered.

The quantity (the number of users) is information indicative of the number of the users who can use the service by the license. The number of apparatuses which are being used is information indicative of the number of the apparatuses where the service can be used by the license. The number of users in use is information indicative of the number of the users who can use the service by the license. The contract mode is information indicative of whether the license is the license for the formal contract or the license (the trial license) of a trial contract.

In the license information illustrated in FIG. 11, the quantity (the number of apparatuses) and the quantity (the number of users) are separately provided as the data items. However, the quantity (the number of apparatuses) and the quantity (the number of users) may be treated as the same data item.

Referring to the license information of FIG. 11, the tenant license and the service license are in a relationship between a parent and the child. In the license information illustrated in FIG. 11, the tenant license corresponds to a parent license and the service license corresponds to a child license. The tenant license to be the parent license is set to the parent license ID. In the license information illustrated in FIG. 11, although the relationship between the parent and the child of the tenant license and the service license is illustrated, a relationship of more than 3 hierarchies such as a relationship among the parent, the child, and the grandchild may exist.

The tenant license is necessary to use the service platform providing system 40. Without the tenant license, the service platform providing system 40 cannot open the tenant. By handling the tenant license in the same data format as that of the service license, it becomes possible to bill the tenant itself or provide a difference in a service level (a speed or a capacity) depending on the amount of the bill. The service platform providing system 40 provides a service to multiple tenants and provides a user administration independent for each tenant.

The service platform providing system 40 performs an access limitation by preventing the data from being referred to between the tenants. Therefore, it is necessary to open the tenant before using all the services in the service platform providing system 40. Because the relationship between the parent and the child has a very flexible data structure, it is possible to represent a grouping of the licenses in, for example, a volume license.

In a case of the volume license, the activated apparatus is administered by activated apparatus view information as illustrated in FIG. 12. FIG. 12 is a structural view of exemplary activated apparatus view information. The activated apparatus view information is stored in, for example, the license information memory unit 154.

Referring to FIG. 12, data items of the activated apparatus view information are the service ID, the tenant ID, the machine type and machine number, the activated date, and so on. The service ID is identification information for identifying the service license.

The tenant ID and the machine type and machine number are information of the tenant ID and information of the machine type and machine number of the apparatus activated using the service ID. The activated date is set to be a date when the apparatus is activated using the service ID.

FIG. 13 illustrates a structure of exemplary apparatus information. Referring to FIG. 13, the apparatus information includes data items such as a tenant ID, device authentication information, business office information, capability and so on. The device authentication information is for a device authentication (an apparatus authentication), by which it is determined that the office apparatus is provided with specific conditions.

The device authentication information may be an ID indicating that a specific application is installed in the office apparatus, a machine type number indicating that the machine is a specific office apparatus, or the like. The business office information represents, for example, a business office where the office apparatus is installed. For example, the capability represents a performance of the office apparatus.

<Detailed Process>

In the information processing system 1 of the first embodiment, the authentication agent apparatus 31 performs the access control using the authentication ticket and makes the authentication agent API public. The access control using the authentication ticket includes an access control using the user authentication ticket and an access control using the apparatus authentication ticket.

A path required to be protected using the user authentication ticket and a path required to be protected using the apparatus authentication ticket are designated in the authentication agent apparatus 31. If a request is to the path required to be protected using the user authentication ticket, the authentication agent apparatus 31 performs the access control using the user authentication ticket. If a request is to the path required to be protected using the apparatus authentication ticket, the authentication agent apparatus 31 performs the access control using the apparatus authentication ticket.

Hereinafter, described are the access control using the user authentication ticket, the access control using the apparatus authentication ticket, and the authentication agent API.

<<Access Control Using User Authentication Ticket>>

In order to perform the access control using the user authentication ticket, the authentication agent apparatus 31 uses a setup file having setup items as illustrated in FIG. 14. FIG. 14 illustrates a structure of exemplary setup items.

The setup items set to the setup file includes, for example, a redirect destination URL, an HTTP header indicative of a multifunction peripheral (MFP), a header to be given, an authentication ticket name, an authentication platform address, a setup of HTTPS, a cache time, and a protection exclusion URL.

The redirect destination URL designates a redirect URL used when the authentication ticket is incorrect and when an unexpected error occurs in the authentication agent apparatus 31. The HTTP header indicative of the MFP designates a HTTP header, with which an access from the MFP can be determined, such as User-Agent. The HTTP header indicative of MFP is an example and it is sufficient that an access from the image forming apparatus 12 is designated.

The header to be given designates information and a header name, both of which are given to the HTTP header, in a case where the authentication ticket is right (authorized). The authentication ticket name is used to designate the authentication ticket whose name is in a cookie. The authentication platform address designates the URL of an authentication ticket inquiry destination in inquiring the authenticity of the authentication ticket. The setup of HTTPS designates whether a self-signature is acceptable (ok) or no check is allowed.

The cache time designates a time of caching the authentication ticket. The protection exclusion URL does not determine the authenticity of the authentication ticket, and designates a URL immediately permitted without determining the authenticity of the authentication ticket.

The setup items in FIG. 14 can designate whether the external vendor providing the service providing apparatus 32 can be changed by each setup item. The setup items in FIG. 14 designate an example where the external vendor can change a protection exclusion URL.

Each service providing system 30 may hold the setup file having the setup items in FIG. 14. Therefore, in the information processing system 1 of the first embodiment, the designation in the setup items can be changes for each service providing apparatus 32. The signature may be done in the setup file having the setup items of FIG. 14 so that the setup items from being changed by ab external vendor.

FIG. 15 is a structural view of an exemplary signed setup file. The setup file of FIG. 15 prevents the setup items from being changed by the external vendor or the like when the signature is done. The authentication agent apparatus 31 verifies the signature before reading the setup item. If the signature is not right, the authentication agent apparatus 31 does not start the process of the access control described below.

A password necessary to decrypt the signature existing inside the setup file may be encrypted using a block encryption and be held as another file inside the authentication agent apparatus 31. The decryption of the signature inside the setup file may be performed in the service platform providing system 40. By encrypting the setup file with the signature attached to the setup file, the authentication agent apparatus 31 verifies the signature so as to prevent the setup items from being changed by the external vendor or the like.

Figure 16:
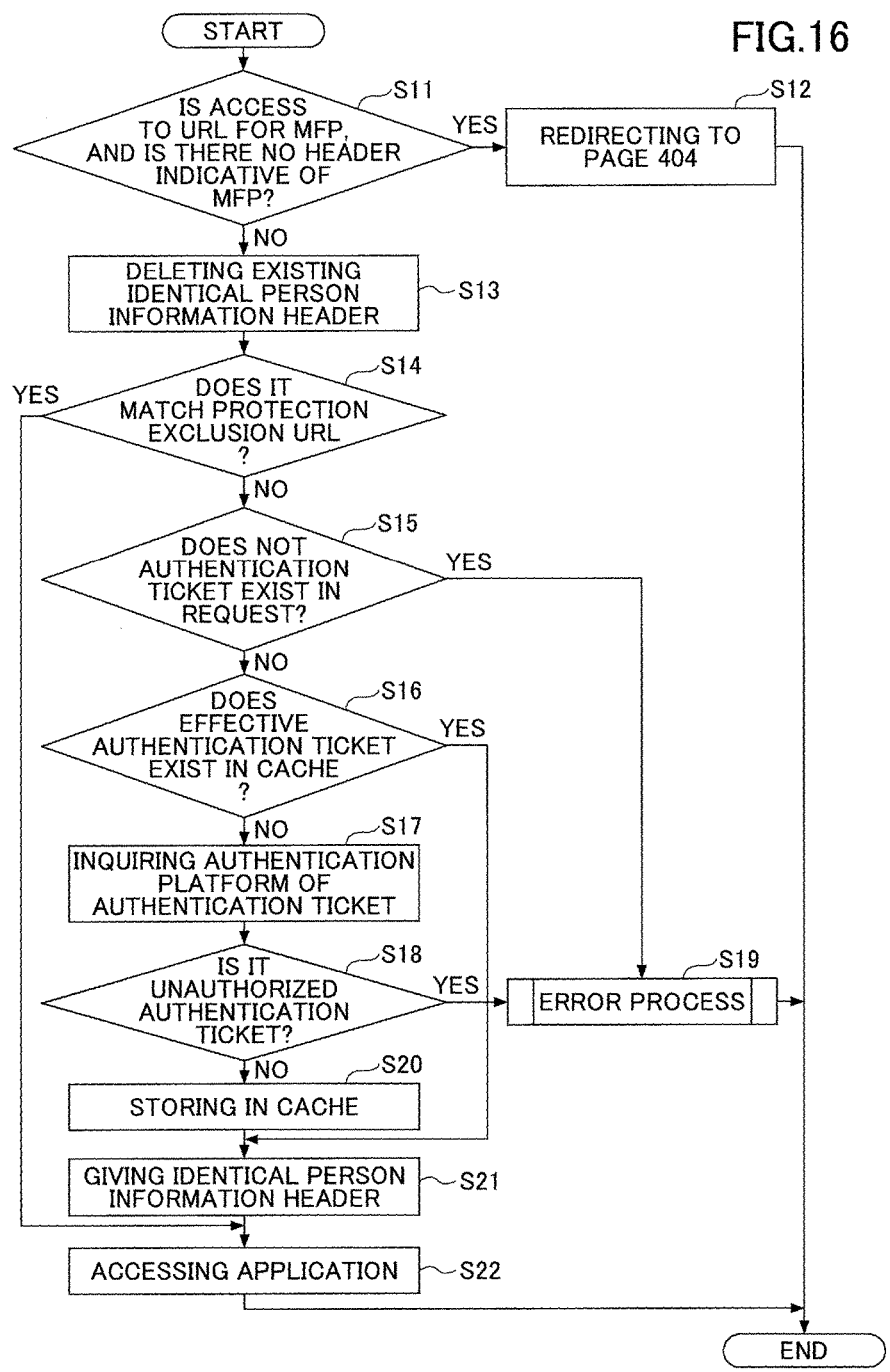
FIG. 16 is a flowchart of an exemplary access control using a user authentication ticket.

FIG. 16 is a flowchart of an exemplary access control using the user authentication ticket. Referring to FIG. 16, the authentication agent apparatus 31 determines in step S11 whether an access from the client 200 is an access to a URL for the MFP and whether there is a HTTP header indicative of the MFP. The HTTP header indicative of the MFP is designated by the setup items illustrated in FIG. 14.

In a case where the access from the client 200 is to the URL for the MFP and there is no HTTP header indicative of the MFP, the authentication agent apparatus 31 proceeds to step S12 so as to redirect to page 404. Page 404 is an example of the error page displayed when the page accessed by the user does not exist.

Other than a case where the access from the client 200 is to the URL for the MFP and there is no HTTP header indicative of the MFP, the authentication agent apparatus 31 proceeds to step S13. In step S13, the authentication agent apparatus 31 deletes an existing identical person information header from the request. The process of step S13 is to delete the identical person information header given on a side of the client 200.

In step S14, the authentication agent apparatus 31 determines whether the URL of the request destination matches a protection exclusion URL. If the URL of the request destination matches the protection exclusion URL, the authentication agent apparatus 31 proceeds to step S22 so as to permit an access to the service providing apparatus 32.

If the URL of the request destination does not match the protection exclusion URL, the authentication agent apparatus 31 proceeds to step S15 so as to determine whether the user authentication ticket exists in the request or not. If the user authentication ticket does not exist in the request, the authentication agent apparatus 31 proceeds to step S19 so as to perform the error process described below.

If the user authentication ticket exists in the request, the authentication agent apparatus 31 proceeds to step S16. In step S16, the authentication agent apparatus 31 determines whether the activated user authentication ticket exists in the cache.

If the activated user authentication ticket exists in the cache, the authentication agent apparatus 31 proceeds to step S21 so as to give an identical person information header illustrated in, for example, FIG. 17 to the HTTP header of the request.

FIG. 17 illustrates a structure of an exemplary identical person information header. The identical person information header includes a user information header and a license information header. The identical person information header has a structure including a HTTP header name and a content. The identical person information headers illustrated in FIGS. 17A and 17B are structured to have a content designated by the setup item of "header to be given" of the setup file.

For example, in an example of the user information header illustrated in FIG. 17A, the tenant ID is given in the name of a HTTP header name of "X-Tenant-Id", the user ID is given in the name of a HTTP header name of "X-User-Id", and the surname is given in the name of a HTTP header name of "X-Last-Name". In an example of the license information header illustrated in FIG. 17B, the service type is given in the name of a HTTP header name of "X-Service-Class", and the charge kind is given in the name of a HTTP header name of "X-Charge-Kind", After giving the identical person information header to the HTTP header of the request in step S21, the authentication agent apparatus 31 proceeds to step S22 so as to permit an access to the service providing apparatus 32.

On the other hand, if the activated user authentication ticket does not exist in the cache in step S16, the authentication agent apparatus 31 proceeds to step S17 so as to inquire the authenticity of the user authentication ticket existing in the request of the service platform providing system 40.

Next, in step S18, the authentication agent apparatus 31 determines whether the user authentication ticket existing in the request is unauthorized based on a result of the inquiry of inquiring the authenticity of the user authentication ticket of the service platform providing system 40. If the user authentication ticket existing in the request is unauthorized, the authentication agent apparatus 31 proceeds to step S19 so as to perform an error process described below.

If the user authentication ticket existing in the request is not unauthorized, the authentication agent apparatus 31 proceeds to step S20 so as to store the authorized user authentication ticket existing in the request into the cache. Thereafter, the authentication agent apparatus 31 gives the identical person information header to the HTTP header of the request in step S21, the authentication agent apparatus 31 proceeds to step S22 so as to permit the access from the client 200 to the service providing apparatus 32.

Figure 18:
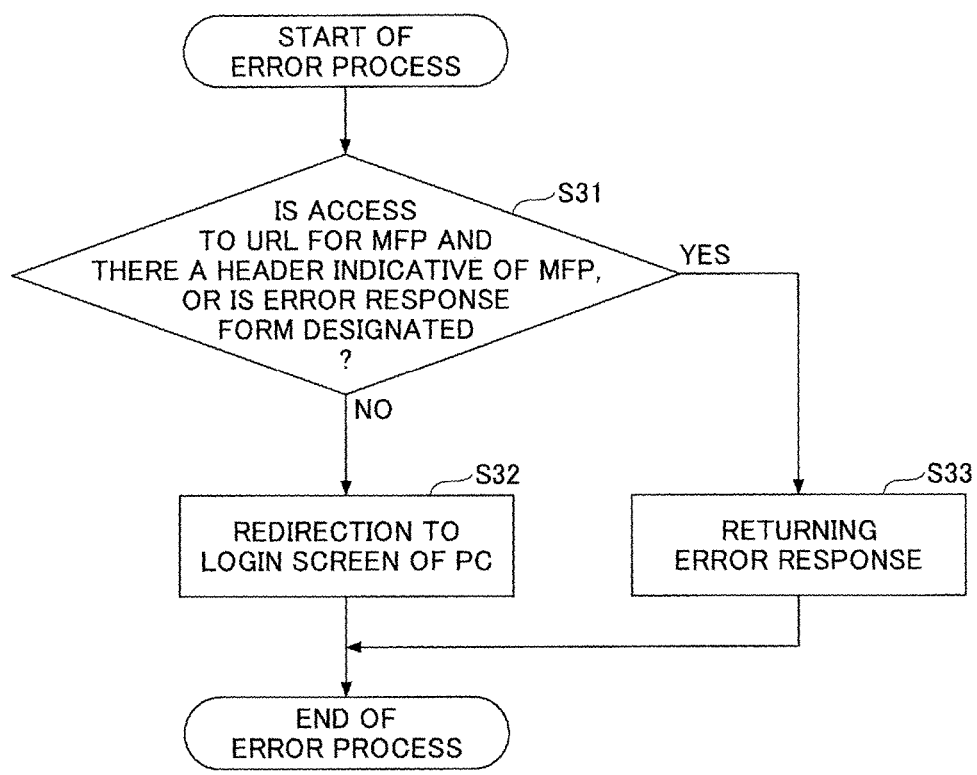
FIG. 18 is a flowchart of an exemplary error process.

The error process of step S19 is performed as illustrated in FIG. 18. FIG. 18 is a flowchart of an exemplary error process. In step S31, the authentication agent apparatus 31 determines whether an access from the client 200 is an access to the URL for the MFP and whether there is a HTTP header indicative of the MFP.

In a case where the access from the client 200 is to the URL for the MFP and there is the HTTP header indicative of the MFP, the authentication agent apparatus 31 proceeds to step S33 so as to return an error response of, for example, a JSON form, to the client 200.

Alternatively, in step S31, the authentication agent apparatus 31 determines whether the error response is designated as a response used in a case where the authentication ticket is unauthorized. For example, in the case where the authentication ticket is unauthorized, the response can be designated when the client 200 gives the response to the HTTP header name of "X-Error-Response-Form" of the request.

In a case where the authentication ticket is unauthorized, the designation of the response using "X-Error-Response-Form" can designates whether the response is made a redirection or the error response of the JSON form, as follows.

The json form→X-Error-Response-Form: json

The redirect form→X-Error-Response-Form: redirect

When the error response is not designated as a response where the authentication ticket is unauthorized, the authentication agent apparatus 31 proceeds to step S32. In step S32, the authentication agent apparatus 31 causes the request from the client 200 to be redirected to a login screen for a PC.

The URL of the access destination of the request from the client 200 is added as query information to the URL of the redirection so as to enable to access the URL of the access destination of the request after the login.

On the other hand, when the error response is designated as a response where the authentication ticket is unauthorized, the authentication agent apparatus 31 proceeds to step S33 so as to return the error response of, for example, the JSON form to the client 200.

By the error process illustrated in FIG. 18, in a case where the authorized user authentication ticket does not exists in the request, the authentication agent apparatus 31 can change the response depending on the type (the user terminal 11, the image forming apparatus 12, or the like) of the client being the request source. In the flow chart illustrated in FIG. 18, the client 200 returns the response in the JSON form in a case where the client 200 is the image forming apparatus 12 and makes the response redirect in a case where the client 200 is the user terminal 11.

FIG. 19 is a sequence charts of an exemplary access control using the user authentication ticket. In step S51, the client 200 operated by the user requests the login by designating the tenant ID, the user ID, and the password.

In step S52, the portal service application 111 requests the authentication and permission unit 131 to login by designating the tenant ID, the user ID, and the password. The authentication and permission unit 131 performs the authentication using the designated the tenant ID, the user ID, and the password. When the authentication is successful, the authentication and permission unit 131 issues the user authentication ticket. The authentication and permission unit 131 causes the session DB 181 to store the tenant ID, the user ID, and the user authentication ticket while associating these. The session DB 181 is a memory unit for storing session information.

The authentication and permission unit 131 reports the issued user authentication ticket to the client through the portal service application 111. Then, in step S54, the client 200 sends a request including a user authentication ticket to the service providing system 30. An API can be used for the request in step S54.

In step S55, the authentication agent apparatus 31 of the service providing system 30 requests the authentication and permission unit 131 of the service platform providing system 40 to check the user authentication ticket included in the request from the client 200. In step S56, the authentication and permission unit 131 searches a record of the session DB 181 using the user authentication ticket requested to be checked and acquires the tenant ID and the user ID associated with the user authentication ticket requested to be checked.

When the authentication and permission unit 131 cannot search the tenant ID and the user ID associated with the user authentication ticket requested to be checked, the authentication and permission unit 131 returns a check result indicative of the unauthorized user authentication ticket to the authentication agent apparatus 31. For example, the authentication agent apparatus 31 returns an error response or a redirection to the client 200.

The authentication and permission unit 131 that acquires the tenant ID and the user ID associated with the user authentication ticket requested to be checked searches a user and tenant DB 182 in step S57 and acquires user related information corresponding to the user authentication ticket in step S57. The user and tenant DB 182 corresponds to the tenant information memory unit 152 and the user information memory unit 153, illustrated in FIG. 5.

In step S58, the authentication and permission unit 131 searches a license DB 183 and acquires the license related information corresponding to the user authentication ticket. The license DB 183 corresponds to the license information memory unit 154 illustrated in FIG. 5.

In step S59, the authentication and permission unit 131 reports ticket related information including the acquired user related information and the acquired license related information to the authentication agent apparatus 31. In step S60, the authentication agent apparatus 31 adds the identical person information header illustrated in FIG. 17 to the HTTP header of the request based on the reported ticket related information.

When the authentication agent apparatus 31 determines that there is no service authority by checking license related information, the HTTP header name of "X-no-Permission-Reason" of the identical person information header included in the identical person information header is given as follows.

FIG. 20 illustrates how a value of HTTP header name "X-no-Permission-Reason" is given. As illustrated in FIG. 20, the value of the HTTP header name of "X-no-Permission-Reason" indicates a reason why there is no service authority depending of a combination of the contract end date, the charge kind, and the executable action, which are included in the example of the license information header illustrated in FIG. 17B. Referring to FIG. 20, a trial deadline expiry, a formal contract deadline expiry, a contact being not yet concluded, a formal contract deadline expiry are indicated as a reason of no service authority.

Because the contract end date included in the example of the license information header indicates a date when the contract is actually ends, no value is input without an actual end of the contract. Therefore, it is possible to determine that the contract ends when the contract end date has a value in it. Therefore, it is possible to determine that the contract does not end when the contract end date has no value.

Referring to FIG. 20, the authentication agent apparatus 31 can determine that the service authority does not exist and a reason why the service authority does not base on a combination of the contract end date, the charge kind, the executable action, which are included in the example of the license information header illustrated in FIG. 20. Therefore, in a case where the authentication agent apparatus 31 determines that there is no service authority, the reason why there is no service authority can be given as a value of the HTTP header name of "X-no-Permission-Reason".

Referring back to FIG. 19, in step S61, the authentication agent apparatus 31 requests the service providing apparatus 32 to provide the service using the request, in which the identical person information header in FIG. 17 is added to the HTTP header. The API can be used for the request in step S61. The service providing apparatus 32 provides the service in response to the request to the client 200.

The service providing apparatus 32 can acquire a content of the user information header and the license information header from the request, in which the identical person information header in FIG. 17 is added to the HTTP header. The content of the user information header and the license information header may include information held by the service platform providing system 40.

Therefore, if the service providing apparatus 32 does not directly access the service platform providing system 40, the service providing apparatus 32 may acquire information held by the service platform providing system 40 and use the acquired information to provide the service to the user.

As described, according to the access control using the user authentication ticket of the first embodiment, the access control can be performed using the user authentication ticket in response to the request to the path required to be protected by the user authentication ticket. According to the access control using the user authentication ticket of the first embodiment, the request including the information held by the service platform providing system 40 can be provided to the service providing apparatus 32 by using the setup file including the setup items in FIG. 14. The request may include the user information or the license information in, for example, FIG. 17. Further, the request may include information designating a response form.

<<Access Control Using Apparatus Authentication Ticket>>

The access control using the apparatus authentication ticket is similar to the access control using the user authentication ticket except for a part. Therefore, an explanation is properly omitted. In order to perform the access control using the apparatus authentication ticket, the authentication agent apparatus 31 has setup items illustrated in FIG. 14.

FIG. 21 is a flowchart of an exemplary access control using the apparatus authentication ticket. Referring to FIG. 21, the authentication agent apparatus 31 proceeds to step S81 and determines whether the apparatus authentication ticket does not exist in the request. If the apparatus authentication ticket does not exist in the request, the authentication agent apparatus 31 proceeds to step S87 and returns an error response.

If the apparatus authentication ticket exists in the request, the authentication agent apparatus 31 proceeds to step S82 and determines whether an activated apparatus authentication ticket exists in the cache. If the activated apparatus authentication ticket exist in the cache, the authentication agent apparatus 31 proceeds to step S86 so as to give an apparatus information header to the HTTP header of the request in a procedure similar to that in the identical person information header. After the authentication agent apparatus 31 gives an apparatus information header to the HTTP header of the request, the authentication agent apparatus 31 permits an access to the service providing apparatus 32.

On the other hand, if the activated apparatus authentication ticket does not exist in the cache in step S82, the authentication agent apparatus 31 proceeds to step S83 so as to inquire the authenticity of the apparatus authentication ticket existing in the request of the service platform providing system 40.

Next, in step S84, the authentication agent apparatus 31 determines whether the apparatus authentication ticket existing in the request is unauthorized based on a result of the inquiry of inquiring the authenticity of the apparatus authentication ticket of the service platform providing system 40. If the apparatus authentication ticket is unauthorized, the authentication agent apparatus 31 proceeds to step S87 and returns an error response.

If the apparatus authentication ticket is not the unauthorized apparatus authentication ticket, the authentication agent apparatus 31 proceeds to step S86 and stores the authorized apparatus authentication ticket existing the request into the cache. After the authentication agent apparatus 31 gives an apparatus information header to the HTTP header of the request in step S86, the authentication agent apparatus 31 permits the access to the service providing apparatus 32.

The authentication agent apparatus 31 requests the service providing apparatus 32 to provide the service by a request in the HTTP header, to which the apparatus information header is given. The service providing apparatus 32 provides the service in response to the request to the client 200.

The service providing apparatus 32 can acquire the content of the apparatus information header from the request given to the HTTP header. The content of the apparatus information header may include information held by the service platform providing system 40.

Therefore, if the service providing apparatus 32 does not directly access the service platform providing system 40, the service providing apparatus 32 may acquire information held by the service platform providing system 40 and use the acquired information to provide the service to the user.

As described, according to the access control using the apparatus authentication ticket of the first embodiment, the access control can be performed using the apparatus authentication ticket in response to the request to the path required to be protected by the apparatus authentication ticket. According to the access control using the apparatus authentication ticket of the first embodiment, the request including the information held by the service platform providing system 40 can be provided to the service providing apparatus 32 by using the setup file.

<<Authentication Agent API>>

The authentication agent apparatus 31 implements the authentication agent API and make the authentication agent API public. When the request using the authentication agent API is received from the service providing apparatus 32, the authentication agent apparatus 31 performs a process illustrated in FIG. 22.

FIG. 22 is a flowchart of an exemplary authentication agent API. Referring to FIG. 22, the authentication agent apparatus 31 determines in step S101 whether an access from the service providing apparatus 32 is an access to the URL for the MFP and whether there is a HTTP header indicative of the MFP. The HTTP header indicative of the MFP is designated by the setup items illustrated in FIG. 14.

In a case where the access from the service providing apparatus 32 is to the URL for the MFP and there is no HTTP header indicative of the MFP, the authentication agent apparatus 31 proceeds to step S102 so as to redirect to page 404.

In a case other than the case where the access from the service providing apparatus 32 is to the URL for the MFP and there is no HTTP header indicative of the MFP, the authentication agent apparatus 31 proceeds to step S103 so as to determine whether the authentication ticket does not exist in the request. If the authentication ticket does not exist in the request, the authentication agent apparatus 31 proceeds to step S107 and returns an error response.

If the user authentication ticket exists in the request, the authentication agent apparatus 31 proceeds to step S104. In step S104, the authentication agent apparatus 31 determines whether the activated authentication ticket exists in the cache. If the authentication ticket exists in the cache, the authentication agent apparatus 31 proceeds to step S109 and returns a response corresponding the request.

On the other hand, if the activated authentication ticket does not exist in the cache in step S104, the authentication agent apparatus 31 proceeds to step S105 so as to inquire the authenticity of the authentication ticket existing in the request of the service platform providing system 40.

Next, in step S106, the authentication agent apparatus 31 determines whether the authentication ticket existing in the request is unauthorized based on a result of the inquiry of inquiring the authenticity of the authentication ticket of the service platform providing system 40.

If the authentication ticket is unauthorized, the authentication agent apparatus 31 proceeds to step S107 and returns an error response. If the authentication ticket is not an unauthorized authentication ticket, the authentication agent apparatus 31 proceeds to step S108 and stores the authorized authentication ticket existing in the request.

The cache storing the authentication ticket is shared for the access control by the authentication ticket. Therefore if the authentication ticket is stored in the cache using the authentication agent API, it is determined that the authentication ticket exists in the cache at a time of accessing using the authentication ticket. Thereafter, the authentication agent apparatus 31 returns a response corresponding to the request in step S109.

FIG. 23 illustrates an exemplary authentication agent API. FIG. 23A illustrates a case where there is no authentication agent API. FIG. 23B illustrates a case where there is an authentication agent API. Referring to FIGS. 23A and 23B, an example where the authentication agent apparatus 31 and the service providing apparatus 32 exist in the same network A and the service platform providing system 40 exists in the network B different from the network A is illustrated.

As illustrated in FIG. 23A, in a case where there is no authentication agent API, the service providing apparatus 32 needs to directly acquire necessary information from the service platform providing system 40. In the service platform providing system 40, it is necessary to make the API used by the service providing apparatus 32 in order to receive the access from the service providing apparatus 32. Further, in a case where there is no authentication agent API, a cross domain needs to be provided.

On the other hand, in a case where there is the authentication agent API as illustrated in FIG. 23B, the service providing apparatus 32 can acquire necessary information from the service platform providing system 40 through the authentication agent apparatus 31.

In the service platform providing system 40, it is unnecessary to make public the API used by the service providing apparatus 32 to receive the information because the service platform providing system 40 does not directly receive an access from the service providing apparatus 32. Further, in a case where there is the authentication agent API, the cross domain needs not to be provided.

FIG. 24 illustrates an exemplary response of the authentication agent API. In the response of the authentication agent API returned from the authentication agent apparatus 31 to the service providing apparatus 32, information 1000 is added in the header as illustrated in, for example, FIG. 24. Therefore, the service providing apparatus 32 acquires the information 1000 from the service platform providing system 40 through the authentication agent apparatus 31 by using the authentication agent API.

Figure 25:
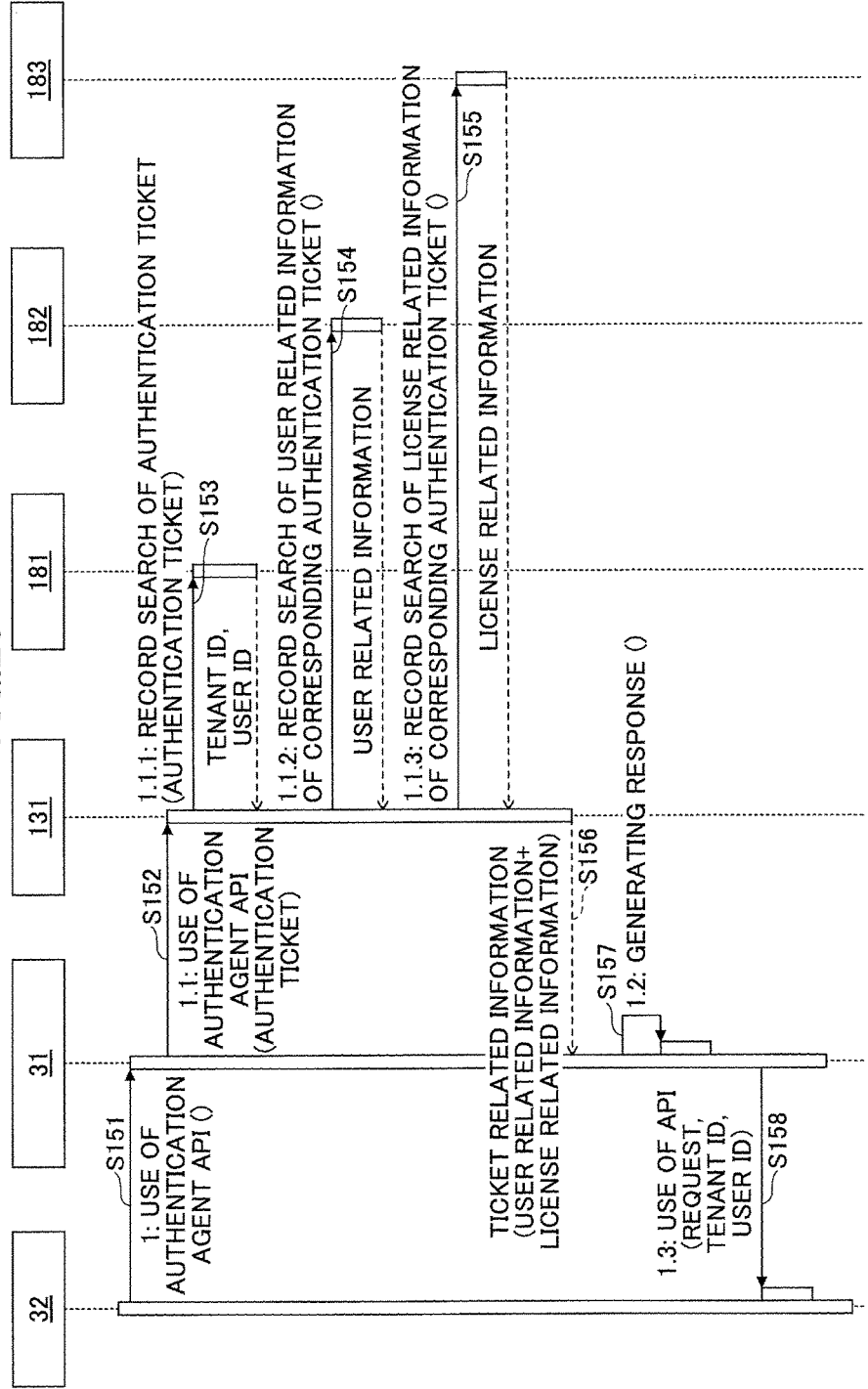
FIG. 25 is a sequence chart of an exemplary authentication agent API.

FIG. 25 is a sequence chart of an exemplary authentication agent API. Although it is omitted in the sequence chart of FIG. 25, the service providing apparatus 32 acquires an activated authentication ticket.

In step S151, the service providing apparatus 32 uses the authentication agent API to request an acquisition of the information from the service platform providing system 40 using the authentication agent API. The authentication ticket is included in the request.

In step S152, the authentication agent apparatus 31 requests the service platform providing system 40 to acquire the information by designating the authentication ticket included in the request from the service providing apparatus 32.

The authentication and permission unit 131 of the service platform providing system 40 proceeds to step S153 so as to search records in the session DB 181 using the authentication ticket and acquires the tenant ID and the user ID corresponding to the authentication ticket.

If the authentication and permission unit cannot search for the tenant ID and the user ID corresponding to the authentication ticket, the authentication and permission unit returns an error response to the authentication agent apparatus 31. The authentication and permission unit 131 that acquires the tenant ID and the user ID corresponding to the authentication ticket searches the user and tenant DB 182 and acquires user related information corresponding to the authentication ticket in step S154. In step S155, the authentication and permission unit 131 searches the license DB 183 and acquires the license related information corresponding to the authentication ticket.

In step S156, the authentication and permission unit 131 reports ticket related information including the acquired user related information and the acquired license related information to the authentication agent apparatus 31. In step S157, the authentication agent apparatus 31 generates a response using the reported ticket related information. At least a part of the reported ticket related information may be included in the reported ticket related information. In step S158, the authentication agent apparatus 31 returns the generated response to the service providing apparatus 32.

Therefore, if the service providing apparatus 32 does not directly access the service platform providing system 40, the service providing apparatus 32 may acquire information held by the service platform providing system 40 and use the acquired information to provide the service to the user.

As described, in the information processing system 1 of the first embodiment, the authentication agent API acquiring the information from the service platform providing system 40 is provided and causes the service providing apparatus 32 to use.

Thus, the service platform providing system 40 can provide the information necessary for the service providing apparatus 32 of providing the service without providing a structure in which an inquiry of the information is directly received from the service providing apparatus 32.

The user terminal 11 and the image forming apparatus 12 are an example of a service use apparatus. The authentication agent apparatus 31 is an example of an access control unit or an access control apparatus. The service platform providing system 40 is an example of an information providing unit or an information providing apparatus. The authentication ticket is an example of information of a completed authentication.

According to the embodiment, the information is included in the request in which the authorized authentication ticket is included, and this information may be sent from the access control apparatus 31 to the service providing apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2014-221763, filed on Oct. 30, 2014, the entire contents of which are incorporated herein by reference.

What is claimed is:

1. An information processing system including at least one information processing apparatus, the information processing system comprising:
 a first processor that is connected to a service providing apparatus via a network and configured to receive a request to use the service providing apparatus from a service use apparatus, to give, in a case where the request includes information of a completed authentication, based on setup information in which a type of giving information to be given to the request is set, the giving information of the type set in the setup information, and to send the request along with the giving information to the service providing apparatus, the giving information indicating information to be given to a HTTP header of the request and a name of a header to be given to the HTTP header of the request when an authentication is successful, the service providing apparatus providing a service requested by the service use apparatus based on the giving information; and
 a second processor that is configured to administer the giving information corresponding to the information of the completed authentication, and to provide the giving information corresponding to the information of the completed authentication received from the first processor to the first processor,
 wherein the first processor receives the request from the service providing apparatus, and gives, in a case where the request includes the information of the completed authentication, the giving information of the type set to the setup information to a response corresponding to the request,
 wherein the first processor stores the authorized information of the completed authentication, which is included in the request from the service use apparatus to the service providing apparatus or the authorized information of the completed authentication, which is included in the request from the service providing apparatus, in a memory unit, and
 wherein, when the memory unit stores the information of the completed authentication, the first processor uses the information of the completed authentication.

2. The information processing system according to claim 1,
 wherein the first processor receives the request from the service providing apparatus using an application programming interface (API).

3. The information processing system according to claim 1,
   wherein the first processor differentiates an access control corresponding to the information of the completed authentication by determining a type of the service use apparatus based on the information indicative of the type of the service use apparatus included in the request and set to the setup information.

4. The information processing system according to claim 1,
   wherein, in a case where a form of the response is designated when the information of the completed authentication is not authorized, the first processor returns an error response for the request in the designated form.

5. The information processing system according to claim 1,
   wherein, in a case where the request is from the service use apparatus having no authority of using the service, the first processor gives a reason why there is no authority of using the service to the request, and send the request to the service providing apparatus.

6. The information processing system according to claim 1,
   wherein the first processor gives the giving information to a header portion of the request.

7. An information processing apparatus comprising:
   a first processor that is connected to a service providing apparatus via a network and configured to receive a request to use the service providing apparatus from a service use apparatus, to give, in a case where the request includes information of a completed authentication, based on setup information in which a type of giving information to be given to the request is set, the giving information of the type set in the setup information, and to send the request along with the giving information to the service providing apparatus, the giving information indicating information to be given to a HTTP header of the request and a name of a header to be given to the HTTP header of the request when an authentication is successful, the service providing apparatus providing a service requested by the service use apparatus based on the giving information; and
   a third processor that is configured to acquire the giving information corresponding to the information of a completed authentication from an information providing apparatus which administers the giving information corresponding to information of the completed authentication,
   wherein the first processor receives the request from the service providing apparatus, and gives, in a case where the request includes the information of the completed authentication, the giving information of the type set to the setup information to a response corresponding to the request,
   wherein the first processor stores the authorized information of the completed authentication, which is included in the request from the service use apparatus to the service providing apparatus or the authorized information of the completed authentication, which is included in the request from the service providing apparatus, in a memory unit, and
   wherein, when the memory unit stores the information of the completed authentication, the first processor uses the information of the completed authentication.

8. An access control method performed in an information processing system including an access control apparatus which is connected to a service providing apparatus via a network and receives a request to use the service providing apparatus from a service use apparatus, and an information providing apparatus which administers giving information corresponding to information of a completed authentication and provides the giving information corresponding to the information of the completed authentication to the access control apparatus, the access control method comprising:
   acquiring, in a case where the request includes information of the completed authentication, by the access control apparatus, the giving information corresponding to the information of the completed authentication from the information providing apparatus, the giving information indicating information to be given to a HTTP header of the request and a name of a header to be given to the HTTP header of the request when an authentication is successful, the service providing apparatus providing a service requested by the service use apparatus based on the giving information;
   giving, based on setup information in which a type of giving information to be given to the request is set, the giving information of the type set in the setup information, and sending the request along with the giving information to the service providing apparatus,
   receiving the request from the service providing apparatus, and giving, in a case where the request includes the information of the completed authentication, the giving information of the type set to the setup information to a response corresponding to the request,
   storing the authorized information of the completed authentication, which is included in the request from the service use apparatus to the service providing apparatus or the authorized information of the completed authentication, which is included in the request from the service providing apparatus, in a memory unit, and
   when the memory unit stores the information of the completed authentication, using the information of the completed authentication.

9. The information processing system according to claim 1, wherein the information of the completed authentication includes an authentication ticket.

10. The information processing system according to claim 1, wherein a name of the authentication ticket designates a name in a cookie for the authentication ticket.

11. The information processing system according to claim 1, wherein the first processor is configured to send the request along with the giving information to the service providing apparatus only when the authentication is successful.

12. The information processing system according to claim 1, wherein the giving information includes an identical person information header including a user information header and a license information header.

13. The information processing system according to claim 1, wherein the information of the completed authentication includes a user authentication ticket and a device authentication ticket.

* * * * *